(12) United States Patent
Ozawa et al.

(10) Patent No.: US 8,820,586 B2
(45) Date of Patent: Sep. 2, 2014

(54) POWDER/GRANULAR MATERIAL FEEDING DEVICE

(71) Applicant: Kubota Corporation, Osaka (JP)

(72) Inventors: Nobuyuki Ozawa, Osaka (JP);
Tsuneaki Sanada, Osaka (JP);
Nobuhisa Horikiri, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/693,355

(22) Filed: Dec. 4, 2012

(65) Prior Publication Data

US 2013/0146619 A1   Jun. 13, 2013

(30) Foreign Application Priority Data

Dec. 8, 2011  (JP) .................................. 2011-268449
Aug. 20, 2012  (JP) .................................. 2012-181277

(51) Int. Cl.
 *B65G 65/46* (2006.01)
(52) U.S. Cl.
 USPC ............................ 222/236; 222/226; 222/410
(58) Field of Classification Search
 USPC .......... 222/236, 226, 239, 412, 410, 413, 414
 See application file for complete search history.

(56) References Cited

U.S. PATENT DOCUMENTS

| | | | | |
|---|---|---|---|---|
| 1,290,090 A | * | 1/1919 | Cole | 222/370 |
| 2,056,478 A | * | 10/1936 | Miller | 110/101 CF |
| 3,417,903 A | * | 12/1968 | Callen | 222/238 |
| 3,592,368 A | * | 7/1971 | Huette | 222/410 |
| 3,719,307 A | * | 3/1973 | Larson | 222/236 |
| 3,881,642 A | * | 5/1975 | Hoenisch | 222/370 |
| 4,083,475 A | | 4/1978 | Venner et al. | 222/198 |

(Continued)

FOREIGN PATENT DOCUMENTS

| | | | | |
|---|---|---|---|---|
| DE | 91 03 810.3 | | 5/1991 | ............. B65G 47/19 |
| DE | 20 2004 002 601 | | 5/2004 | ............. G01F 13/00 |

(Continued)

OTHER PUBLICATIONS

WO 2010001571 A1 translation, Kato, Jan. 2010.*

(Continued)

*Primary Examiner* — Paul Durand
*Assistant Examiner* — Donnell Long
(74) *Attorney, Agent, or Firm* — Kusner & Jaffe

(57) ABSTRACT

A provided powder/granular material feeding device fully satisfies the function of sufficiently preventing bridges and ratholes and the function of favorably stabilizing the filling rate of an outlet portion. Moreover, the powder/granular material feeding device does not require consumable items such as a flexible chute or leave a large amount of powder/granular material in a specific region inside a chute. The powder/granular material feeding device includes: a hopper 1 that receives powder/granular material; an outlet portion 2 that discharges powder/granular material; a chute 3 that guides, into the outlet portion 2, powder/granular material dropped from the hopper 1; and a stirring part 4 that rotates stirring members 4b about a shaft 4a protruding so as to tilt diagonally upward from the lower part of the interior of the chute 3.

11 Claims, 26 Drawing Sheets

(56) References Cited

U.S. PATENT DOCUMENTS

| | | | |
|---|---|---|---|
| 5,245,949 A * | 9/1993 | Hively | 119/53 |
| 5,381,967 A * | 1/1995 | King | 239/659 |
| 6,039,220 A * | 3/2000 | Jablonski et al. | 222/236 |
| 6,389,962 B1 * | 5/2002 | Han et al. | 99/455 |
| 7,748,575 B2 * | 7/2010 | Hanaoka et al. | 222/240 |
| 8,136,706 B2 * | 3/2012 | Jung | 222/413 |
| 2007/0170209 A1 * | 7/2007 | Lehmann | 222/236 |
| 2011/0031280 A1 | 2/2011 | Kato | 222/239 |
| 2011/0297754 A1 * | 12/2011 | Valdez | 239/8 |

FOREIGN PATENT DOCUMENTS

| | | | |
|---|---|---|---|
| FR | 2 324 550 | 4/1977 | B65G 65/68 |
| JP | 09-216688 | 8/1997 | B65D 88/68 |
| WO | WO 2009/057319 | 5/2009 | B65G 65/48 |
| WO | WO 2010001571 A1 * | 1/2010 | |

OTHER PUBLICATIONS

Extended European Search Report for EP 12 00 8072.6, Dated Mar. 13, 2013.

* cited by examiner

POWDER/GRANULAR MATERIAL FEEDING DEVICE

FIELD OF THE INVENTION

The present invention relates to powder/granular material feeding devices, and particularly relates to a powder/granular material feeding device suitable for quantitative feeding of powder/granular material.

BACKGROUND OF THE INVENTION

Powder/granular material feeding devices, also called feeders, have been widely known as devices for quantitative feeding of powder/granular material. As illustrated in FIGS. 20 and 21, such a powder/granular material feeding device includes a hopper 51 that receives powder/granular material, an outlet portion 52 having screws 52a for discharging powder/granular material, a chute 53 that guides, into the outlet portion 52, powder/granular material dropped from the hopper 51, and a stirring device 54 that is also called an agitator for agitating powder/granular material in the chute 53 and the hopper 51. The powder/granular material feeding device for quantitative feeding of powder/granular material includes, in addition to these constituent elements (the hopper 51, the outlet portion 52, the chute 53, and the stirring device 54), a metering unit 55 on which these constituent elements are loaded, and a control unit (not shown) that controls the outlet portion 52 so as to keep constant the weight of discharged powder/granular material (the amount of discharged powder/granular material) per hour or the weight of powder/granular material in each discharge.

Various kinds of powder/granular material feeding devices are available. The hopper 51 in FIGS. 20 and 21 is a cylinder that is vertically extended with a constant shape in cross section. A hopper 82 in FIGS. 22, 23A, and 23B is shaped like a rectangular prism. A hopper 61 in FIG. 24 has a curved shape, e.g., a conical or pyramidal shape expanding upward in cross section. As simply illustrated in FIG. 24, the curved hopper 61 expands upward in cross section and can be advantageously reduced in height with a sufficient capacity. However, the hopper 61 with a curved wall surface decreases in cross-sectional area toward the bottom of the hopper 61, causing bridging, that is, partially or entirely remaining powder/granular material with high adhesion and compressibility or a rathole that is a central hole of a material. These phenomena are effectively avoided by adopting a cylindrical hopper or hanging, as illustrated in FIG. 24, a vertical agitator (stirring part) 62 downward into the hopper 61 from the top surface of the hopper 61. A hopper agitator including such a vertical agitator is disclosed in, for example, Japanese Patent Laid-Open No. 9-216688.

Unfortunately, the provision of the vertical agitator 62 requires a space for lifting the agitator 62 during cleaning of the hopper 61 (the hopper 61 is always cleaned each time a powder/granular material type is changed). Furthermore, a top surface 61a of the hopper 61 needs to be lifted with an additional weight of the agitator 62 and an electric motor 63 for driving the agitator, reducing workability of cleaning and so on. For this reason, the agitator in general is not so popular among users.

The chute provided under the hopper contains the stirring device that is a mechanism for agitating powder/granular material in the hopper on the chute to prevent bridges in the hopper. A typical stirring device is, as illustrated in FIGS. 20 and 21, a horizontal agitator that has a stirring part (agitator) 54b for vertically agitating powder/granular material with respect to a shaft 54a protruding from the side of the chute 53. Furthermore, as illustrated in FIG. 25, a table-type powder/granular material feeding device is available that rotates powder/granular material in a circumferential direction by means of a stirring part 72 that is called a vertical agitator. The stirring part 72 rotates about a shaft 71d protruding upward from a bottom 71a of a chute 71. Moreover, as illustrated in FIGS. 22, 23A, and 23B, a powder/granular material feeding device of flexible chute type is available in which a chute 81 disposed under the hopper 82 is made of flexible resin and is deformed from the outside so as to move an internal material.

The stirring device (stirring part) also supplies powder/granular material into an outlet portion provided under the stirring device and stabilizes the powder/granular material with a high filling rate in the outlet portion. The stable filling rate in the outlet portion remarkably contributes to more stable discharging capability and higher feeding accuracy (small variations).

The outlet portion is a screw-type outlet (double screws or a single screw) using the screws 52a and a screw 84 illustrated in FIGS. 21 to 23B. The outlet portion may be vibration type, belt type, disk type, and so on. However, the screw type is the most suitable for powder/granular materials having various properties, e.g., adhesion and discharge. The single screw 84 (see FIGS. 22, 23A, and 23B) is preferably used for a less adhesive material, whereas the double screws 52a (see FIG. 21) capable of self-cleaning is preferably used for a highly adhesive material. The double screws capable of offsetting screw pulsations are frequently used for high feeding accuracy.

Hence, the stirring part of the stirring device disposed in the chute has the function of feeding a material to the screw acting as the outlet portion under the hopper as well as the function of preventing bridges in the hopper disposed on the chute. The stirring part is a mechanism that plays a key role in the powder/granular material feeding device and is quite important in determining the performance and character of the powder/granular material feeding device.

The conventionally used powder/granular material feeding devices of the respective types and the advantages and disadvantages thereof will be specifically described below.

FIGS. 20, 21, and 26 illustrate the powder/granular material feeding devices, each having the horizontal stirring part called a horizontal agitator. The two types of powder/granular material feeding devices have the dome-shaped chute 53 in FIGS. 20 and 21 and a square chute 91 in FIG. 26. The rectangular-prism chute 91 in FIG. 26 can be produced by boiler making (also called a welded structure). A screw 92a with a flat driving side and a flat discharging side allows the opening of the chute 91 to have a relatively simple sealing structure that advantageously facilitates sealing. Moreover, the rectangular-prism chute 91 and a screw casing 92b that accommodates the screws (outlet portion) 92a are linearly in contact with each other, forming a long area of feeding to the screws 92a. Thus, the powder/granular material feeding device including the rectangular-prism chute 91 can feed a material that is hard to come into the screws 92a, for example, a film material.

However, a powder/granular material feeding device 90 disadvantageously requires welding over the corners of the chute 91, is likely to deposit or leave a material on the corners of the chute 91, and increases a screw length as compared with the dome-shaped chute 53 (see FIG. 21), forming a dual support structure. Moreover, a hopper (not shown) disposed on the rectangular-prism chute 91 is inevitably shaped like a rectangular prism, so that the chute 91 and the hopper need to be joined with clamps at several points. Disadvantageously, the attachment and detachment of the hopper requires considerable effort and time as compared with the dome-shaped chute. Reference numeral 93 in FIG. 26 denotes the stirring part of the horizontal agitator.

The powder/granular material feeding device with the dome-shaped chute 53 in FIGS. 20 and 21 has no corners on the chute 53, which reduces powder/granular material deposition and residue and facilitates cleaning. The cylindrical hopper 51 that hardly allows powder/granular material deposition is attached on the upper part of the chute 53, and a clamp band 56 can be used on a joining area between the chute 53 and the hopper 51. Advantageously, the hopper 51 can be attached and detached with less effort and time.

However, the dome-shaped chute 53 provided in the powder/granular material feeding device disadvantageously needs to be manufactured with a mold, for example, by drawing or a lost-wax process, so that the dome-shaped chute 53 and a screw casing 52b that accommodates the screws 52a are joined with a slightly complicated configuration. Furthermore, the stirring part (agitator) 54b approaches closest to the screws 52a only at a center point. A space is formed between an agitation range and the screws 52a, and powder/granular material is fed to the screws 52a with a shorter feeding area as compared with the rectangular-prism chute, so that the powder/granular material is less supplied to the screws 52a than in the rectangular-prism chute.

The powder/granular material feeding device having the horizontal agitator vertically agitates powder/granular material by means of the stirring part 54b or 93, vertically moving the powder/granular material regardless of whether the chute is a rectangular prism or a dome. Thus, in the case where the amount of discharged powder/granular material is controlled during measurement, the weight is likely to fluctuate. Particularly, the powder/granular material feeding device is seriously affected by fluctuations in weight during an operation with a low flow rate and thus a control state may be disturbed by the powder/granular material feeding device, disadvantageously leading to lower feeding accuracy.

FIG. 25 is a perspective view illustrating the table-type powder/granular material feeding device. In such a powder/granular material feeding device, the bottom 71a of the chute 71 is shaped like a round table. As has been discussed, powder/granular material is agitated in the circumferential direction by the stirring part 72 that is called a vertical agitator. The stirring part 72 rotates about the shaft 71d that protrudes upward from the bottom 71a of the chute 71. Reference numeral 71b in FIG. 25 denotes a chute outlet for feeding powder/granular material to an outlet portion from the chute 71. In such a so called table-type powder/granular material feeding device, the bottom 71a of the chute 71 can have a relatively large size, allowing a hopper (not shown) to have a large base area. Since the stirring part 72 including the vertical agitator can be provided, bridges can be effectively prevented. A joining area between the chute 71 and the hopper is inevitably circular, allowing the use of a clamp band similar to the clamp band 56 in FIG. 21.

Even in the case of a granular material, e.g., a pellet that does not need agitation, the simple stirring part (agitator) 72 is necessary to prevent quite a large amount of the material from remaining on the bottom 71a shaped like a flat table. Also in the case of a powder material, the material is deposited and left in a gap between the stirring part 72 and the surface of the bottom 71a and on the blade of the stirring part 72. A screw 75 disposed directly under the bottom (table surface) 71a is laterally shifted so as to avoid a driving shaft that rotates the stirring part 72, limiting an area of feeding to the screw 75. Moreover, the stirring part 72 only passes above the screw, reducing the capability of filling to the screw 75.

The screw 75 can be centered by providing another room under the bottom (table surface) 71a. Moreover, the provision of a stirring part (horizontal agitator) 73 around the screw 75 can improve the capability of filling to the screw 75, though a large amount of powder/granular material is left under the screw 75.

FIGS. 22, 23A, and 23B are a perspective view and side cross-sectional views of a powder/granular material feeding device 80 that includes the hopper 82 shaped like a square cylinder (that is, a rectangular prism) on the flexible chute 81. The side of the chute is deformed by a paddle 83 from the outside of the flexible chute 81 to move internal powder/granular material, thereby preventing bridges. In the case of the rectangular-prism hopper 82, powder/granular material having medium flowability, e.g., calcium carbonate or talc is highly unlikely to cause bridges. The rectangular-prism hopper 82 can be more easily manufactured than a conical or pyramidal hopper in terms of the manufacturing cost, leading to lower manufacturing cost. Furthermore, the flexible chute type has a lower resistance than in the rotations of a stirring part acting as a rotating object in powder/granular material. Thus, the capacity of a motor for driving the stirring part can be reduced, achieving a clear cost advantage. Since the resistance is low, the flexible chute 81 can have a larger size, so that the hopper 82 can advantageously have a large capacity with relative ease.

In the powder/granular material feeding device 80 including the flexible chute 81, however, the flexible chute 81 is a consumable item that is an elastic body made of resin or the like. Thus, the flexible chute 81 needs replacing every several years (e.g., two years), requiring running cost for each replacement of the flexible chute 81. Since the paddle 83 desirably comes into contact with a flat surface, the flexible chute 81 and the hopper 82 have squares, which may lead to deposition of a material on the corners of the hopper 82 so as to cause bridges. In other words, the capability of preventing bridges is slightly lower than in the case where the hopper 82 has a circle. Moreover, agitation by the paddle 83 does not generate a force pressing a material to the screw 84, so that the material is dropped and inserted to the screw 84 only by its own weight. Thus, the capability of filling a material to the screw 84 is lower than in internal agitation. Since the flexible chute 81 is vibrated by swinging of the paddle 83, the weight is likely to fluctuate. In the case where the amount of discharged powder/granular material is controlled during measurement, the feeding accuracy may decrease.

DISCLOSURE OF THE INVENTION

As has been discussed, the conventional powder/granular material feeding devices of any types have advantages and disadvantages. Any of the powder/granular material feeding devices does not fully satisfy the function of sufficiently preventing bridges and ratholes, the function of fully stabilizing the filling rate of the outlet portion with a sufficient area of feeding to the screw, and the function of suppressing the amount of remaining powder/granular material. Some of the powder/granular material feeding devices regularly require consumable items such as the flexible chute 81 or leave a large amount of powder/granular material in a specific area inside the chute.

The present invention has been devised to solve the problems. An object of the present invention is to provide a powder/granular material feeding device that fully satisfies the functions of sufficiently preventing bridges and ratholes and fully stabilizing the filling rate of an outlet portion without requiring consumable items such as a flexible chute or leaving a large amount of powder/granular material in a specific area inside the chute.

In order to solve the problems, a powder/granular material feeding device according to the present invention includes: a hopper that receives powder/granular material; an outlet portion that discharges powder/granular material; a chute that guides, into the outlet portion, powder/granular material dropped from the hopper; and a stirring part that rotates a stirring member about a shaft protruding so as to tilt diagonally upward from the lower part of the interior of the chute.

With this configuration, the stirring member rotates about the shaft protruding so as to tilt diagonally upward from the lower part of the interior of the chute. Thus, powder/granular material is agitated diagonally, that is, in various directions such as a vertical direction and a circumferential direction by the stirring member of the stirring part. This configuration sufficiently agitates powder/granular material in the chute and the hopper, thereby preventing the occurrence of bridges and ratholes. Moreover, the track of rotation of the stirring part can be located along the outlet portion, thereby fully stabilizing the filling rate of powder/granular material to the outlet portion. Furthermore, in the case of weight measurement of powder/granular material being discharged, the stirring member rotating about the inclined shaft of the stirring part can reduce vertical motions of agitated powder/granular material and suppress fluctuations in weight as compared with a horizontal agitator including a stirring part that rotates in the vertical direction. The outlet portion preferably contains a screw.

Furthermore, according to the powder/granular material feeding device of the present invention, the shaft of the stirring part protrudes to the center of the interior of the chute in plan view. This configuration can sufficiently agitate powder/granular material over the entire interior of the chute.

Moreover, according to the powder/granular material feeding device of the present invention the chute preferably includes an inclined plane with an inner surface inclined diagonally upward, and the shaft is preferably protruded from the inclined plane. Hence, the chute and the stirring part can be disposed with a relatively simple configuration. Since the shaft of the stirring part is protruded perpendicularly to the inclined plane, the seal structure of the inclined plane of the chute and the shaft can be constructed with relative ease, minimizing an increase in manufacturing cost.

Preferably, the inclined plane of the chute is circular. With this configuration, powder/granular material can be sufficiently agitated and hardly remains near a joining area between the inclined plane and the side wall of the chute. Moreover, the hopper is oval and has a constant cross-sectional shape in the vertical direction, that is, an oval cylinder, thereby minimizing the occurrence of bridges in the hopper without the need for a vertical agitator.

Furthermore, according to the powder/granular material feeding device of the present invention, the outlet portion includes a screw casing having an internal space, the internal space of the screw casing and the bottom space of the chute are linearly connected to each other, and the stirring member provided in the stirring part passes directly above the connected part of the spaces. With this configuration, the bottom of the chute and the screw casing are linearly connected, thereby increasing the dimensions of a feed opening to the screw. Moreover, the stirring member passes directly above the overall feed opening to the screw while pressing powder/granular material. This configuration improves filling of powder/granular material into the screw casing, stably keeping a high filling rate.

The powder/granular material feeding device according to the present invention further includes a driving force transmission mechanism that transmits the driving force of a motor to a screw provided in the outlet portion and the stirring part, wherein the outlet portion and the stirring part are driven through the driving force transmission mechanism. This configuration can reduce the number of motors as compared with the case where motors are used respectively for the screw and the stirring part, achieving lower manufacturing cost.

Furthermore, according to the powder/granular material feeding device of the present invention, the chute includes an inclined plane with an inner surface inclined diagonally upward, a conical wall extended from the outer periphery of the inclined plane, and a side wall that connects the conical wall and the hopper to guide powder/granular material in the hopper to the conical wall of the chute.

In this case, the side wall of the chute may be oval in plan view and may have a constant cross-sectional shape in the vertical direction. With this configuration, the side wall of the chute can have a relatively simple shape.

The side wall of the chute may have a cross-sectional shape expanding in the lower part of the chute relative to the upper part. With this configuration, powder/granular material introduced from the hopper into the chute is hardly compressed, so that a pressure on the side wall of the chute decreases and powder/granular material deposited on the side wall is likely to fall off the side wall by its own weight. This can reliably prevent bridges caused by powder/granular material deposition on the side wall of the chute.

In this case, the side wall of the chute may have a circular upper end in plan view, and the hopper may be circular and have a constant cross-sectional shape in the vertical direction. With this configuration, the hopper can be circular. The hopper can be more easily formed than an oval hopper. Furthermore, the hopper and the chute can be easily connected with a simple structure while the hopper can be connected to other members with a simple structure.

According to the present invention, the stirring member of the stirring part rotates about the shaft protruding so as to incline diagonally upward from the lower part of the interior of the chute, thereby preventing the occurrence of bridges and ratholes. Furthermore, the filling rate of powder/granular material to the outlet portion can be sufficiently stabilized. Even in the case where powder/granular material is discharged during weight measurement, fluctuations in weight can be suppressed, achieving high feeding accuracy. Since the need for consumable items such as a flexible chute can be eliminated, only small maintenance cost is necessary. Moreover, the shaft protruding diagonally upward allows the stirring member, e.g., a stirring blade for agitation in the bottom of the chute to be sufficiently supported on the base of the shaft.

Furthermore, the chute includes the inclined plane that is directed diagonally upward, and the shaft protruded from the inclined plane. Thus, the chute and the stirring part can be disposed with a relatively simple configuration. Moreover, the seal structure of the inclined plane of the chute and the shaft can be constructed with relative ease, suppressing the manufacturing cost.

Since the inclined plane of the chute is circular, powder/granular material can be sufficiently agitated and hardly remains near the joining area between the inclined plane and the side wall of the chute. Moreover, the oval hopper has a constant cross-sectional shape in the vertical direction, thereby minimizing the occurrence of bridges in the hopper without the need for a vertical agitator.

Furthermore, the internal space of the screw casing provided in the outlet portion and the bottom space of the chute are linearly connected to each other, and the stirring member provided in the stirring part passes directly above the connected part. This configuration improves filling of powder/granular material into the screw casing, stably keeping a high filling rate. Consequently, the stability of discharge and the feeding accuracy can be improved.

The side wall of the chute has a cross-sectional shape expanding in the lower part of the chute relative to the upper part. This configuration can satisfactorily prevent powder/granular material deposition on the side wall of the chute, thereby reliably preventing the occurrence of bridges. Therefore, powder/granular material can be stably discharged from the powder/granular material feeding device, improving the feeding accuracy and reliability of the powder/granular material feeding device.

In this case, the upper end of the side wall of the chute may be circular in plan view and the circular hopper may have a constant cross-sectional shape in the vertical direction. With this configuration, the hopper can be circular and thus can be more easily formed than an oval hopper. Furthermore, the hopper and the chute can be easily connected with a simple structure while the hopper can be connected to other members with a simple structure, thereby reducing the manufacturing cost.

BRIEF DESCRIPTION OF THE DRAWINGS

FIG. 12 is a perspective view illustrating double screws and so on;

DESCRIPTION OF THE EMBODIMENTS

Figure 1:
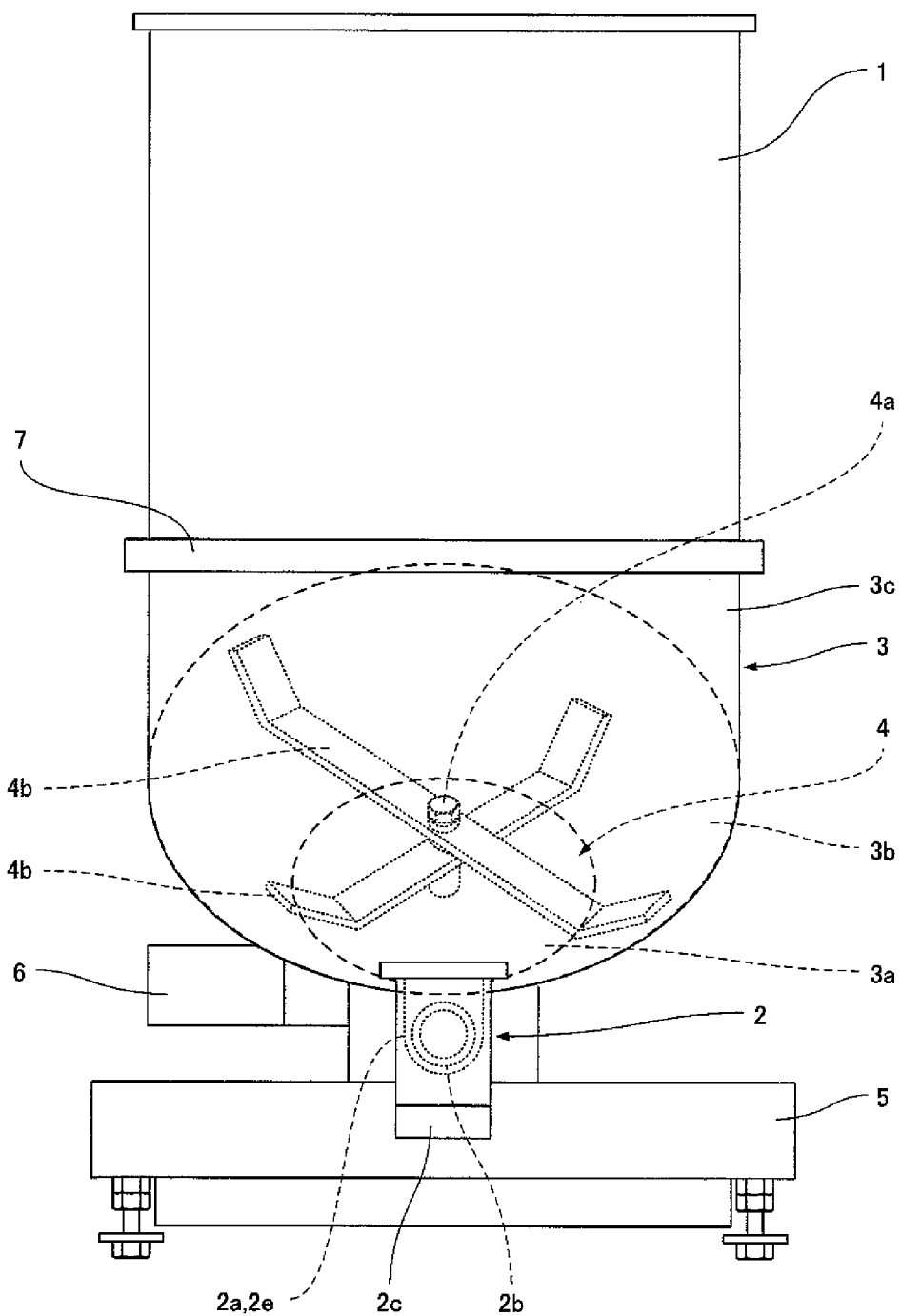
FIG. 1 is a front view illustrating a powder/granular material feeding device according to a first embodiment of the present invention.

A powder/granular material feeding device according to embodiments of the present invention will be described below with reference to the accompanying drawings. These embodiments are merely exemplary and thus the present invention is not always limited to these embodiments. In the following explanation, a direction along which powder/granular material is fed in an outlet portion will be referred to as a forward direction.

As illustrated in FIGS. 1 to 5, a powder/granular material feeding device according to a first embodiment of the present invention includes a hopper 1 that receives powder/granular material, an outlet portion 2 that discharges powder/granular material, a chute 3 that guides, to the outlet portion 2, powder/granular material dropped from the hopper 1, a stirring part 4 that rotates stirring members 4b about a shaft 4a protruding so as to incline diagonally upward from the lower part of the interior of the chute 3, a metering unit 5 loaded with these constituent elements, and a control unit (not shown). Moreover, the top surface of the hopper 1 is covered with a lid, which is not illustrated. The lid is optionally connected to a powder/granular material feed pipe and so on.

The hopper 1 and the upper part of the chute 3 (a side wall 3c of the chute 3) are oval in plan view and have a constant cross-sectional shape in a vertical direction, that is, like an oval cylinder. Particularly, on the rear side of the chute 3, an inclined plane 3a is formed with an inner surface inclined diagonally upward (that is, the inner surface inclined in the forward direction). The stirring part 4 rotates the stirring members 4b, which include stirring blades, about the shaft 4a. In the present embodiment, the shaft 4a of the stirring part 4 is extended perpendicularly to the inclined plane 3*a* from the inclined plane 3*a* and protrudes to the center of the interior of the chute 3 in plan view.

The inclined plane 3*a* of the chute 3 has a round shape. In the present embodiment, the stirring members 4*b* of the stirring part 4 are respectively extended from two points: the proximal end and the leading end of the shaft 4*a* in the radial direction of the inclined plane 3*a*. Moreover, the ends of the stirring members 4*b* are radially extended so as to incline along a conical wall 3*b* and the side wall 3*c* of the chute 3. In the present embodiment, the two stirring members 4*b* of the stirring part 4 are extended perpendicularly to each other in a direction perpendicular to the shaft 4*a* at angles differing from each other by 90 degrees each. The present invention is not limited to this configuration.

The conical wall 3*b* of the chute 3 is conically extended forward, laterally, and upward from the inclined plane 3*a*. The ends of the stirring members 4*b* of the stirring part 4 are rotated along the inner surface of the conical wall 3*b* of the chute 3. The proximal ends of the stirring members 4*b* of the stirring part 4 are rotated along the inner surface of the inclined plane 3*a* of the chute 3. The lower end of the side wall 3*c* of the chute 3 is connected along the outer edge of the conical wall 3*b* of the chute 3. The side wall 3*c* of the chute 3 is oval in plan view and is vertically extended upward while keeping the shape of the lower end. The hopper 1 is identical in shape to the side wall 3*c* of the chute 3 in plan view and is extended upward. The upper end of the chute 3 and the lower end of the hopper 1 can be joined to each other with a clamp band 7, which is not illustrated. Moreover, a gasket 8 is disposed between the upper end of the chute 3 and the lower end of the hopper 1.

The outlet portion 2 is substantially cylindrical in longitudinal section or has a spectacle shape that is laterally extended. An outlet pipe 2*a* and a screw casing 2*e*, which are longitudinally extended, contain a single rotatable screw 2*b* or double rotatable screws 2*b* (the single screw 2*b* in FIGS. 1 to 6). A longitudinally extended part of the conical wall 3*b* of the chute 3 and the upper edge of the screw casing 2*e* are linearly connected and opened. The screw casing 2*e* is filled with powder/granular material from the opening (also called a feed opening). The end of the outlet pipe 2*a* is connected to an exit pipe 2*c* that has an opening at the bottom. Powder/granular material delivered into the exit pipe 2*c* in the screw 2*b* is discharged downward (outside) from the exit pipe 2*c*.

In the present embodiment, a motor 6 is provided diagonally at the rear of the chute 3 and a worm gear 6*a* is provided on the end of the drive shaft of the motor 6. The shaft 4*a* of the stirring part 4 is protruded diagonally downward from the outer surface of the inclined plane 3*a* of the chute 3. A stirring part gear 4*c* is attached to the end of a part protruding downward. Furthermore, the rear end of the shaft of the screw 2*b* is protruded from the rear end of the screw casing 2*e*. An outlet gear 2*d* is attached to the protruded part of the screw 2*b*. The stirring part gear 4*c* and the outlet gear 2*d* are engaged with the worm gear 6*a* attached to the end of the drive shaft of the motor 6. Thus, the motor 6 is driven to rotate the stirring members 4*b* of the stirring part 4 and the screw 2*b* of the outlet portion 2 through the stirring part gear 4*c*, the outlet gear 2*d*, and so on. In other words, in the present embodiment, the worm gear 6*a* attached to the motor 6 and the stirring part gear 4*c* and the outlet gear 2*d* that are engaged with the worm gear 6*a* constitute a driving force transmission mechanism that transmits the driving force of the motor 6 to the screw 2*b* and the stirring members 4*b* of the stirring part 4. The screw 2*b* of the outlet portion 2 and the stirring part 4 are driven through the driving force transmission mechanism.

The constituent elements, specifically, the hopper 1, the chute 3, the stirring part 4, and the outlet portion 2 are placed on the metering unit 5. The total weight of the constituent elements and powder/granular material is measured by the metering unit 5. The control unit (not shown) controls the rotation speed of the screw 2*b* so as to keep constant the weight of discharged powder/granular material (the amount of discharged powder/granular material) per hour or the weight of powder/granular material in each discharge.

In this configuration, the motor 6 is driven to rotate the stirring members 4*b* of the stirring part 4, thereby agitating powder/granular material in the chute 3 and the lower part of the interior of the hopper 1. The powder/granular material is then introduced into the screw casing 2*e* from the lower part of the chute 3, is passed through the outlet pipe 2*a* by the screw 2*b*, and is discharged out of the exit pipe 2*c*.

In this case, the stirring members 4*b* of the stirring part 4 rotate about the shaft 4*a*. The shaft 4*a* protrudes so as to incline diagonally upward from the lower part of the interior of the chute 3, achieving the advantages of a so-called horizontal agitator type and a table type.

Since the shaft 4*a* of the stirring part 4 is disposed in an inclined position, powder/granular material can be sufficiently agitated by the stirring members 4*b* in various directions including the vertical direction and a circumferential direction. Moreover, the hopper 1 has a constant cross-sectional shape, that is, a cylindrical shape in the vertical direction. Hence, the occurrence of bridges and ratholes in the chute 3 and the hopper 1 can be quite satisfactorily prevented. Thus, in the case of calcium carbonate or talc powder/granular material with medium flowability as well as pellet or glass fiber powder/granular material with high flowability, bridges and ratholes can be prevented. Moreover, bridges and ratholes can be satisfactorily prevented for materials including titanium oxide that is likely to increase in adhesion and compressibility with low flowability. Furthermore, this configuration can eliminate the need for a vertical agitator and so on, thereby effectively preventing bridges and so on while suppressing an increase in manufacturing cost with high cleaning performance. This configuration can be reliably applied to most kinds of powder/granular material.

The chute 3 and the outlet portion 2, specifically, the bottom of the chute 3 and the screw casing 2*e* are linearly connected (feed opening), thereby increasing the dimensions of the feed opening to the screw 2*b*. Moreover, the stirring members 4*b* pass directly above the overall feed opening to the screw 2*b* while pressing powder/granular material. This configuration improves filling of powder/granular material into the screw casing 2*e*, stably keeping a high filling rate. Consequently, the stability of discharge and the feeding accuracy can be improved.

Moreover, this configuration hardly moves stirred powder/granular material in the vertical direction as compared with the stirring part of a horizontal agitator. Thus, fluctuations in weight can be suppressed to obtain a stable weight. This stabilizes the control state of the powder/granular material feeding device that controls a weight being measured, achieving high feeding accuracy. Thus, the powder/granular material feeding device can be used for feeding a small amount of powder/granular material in an optimum condition.

Figure 20:
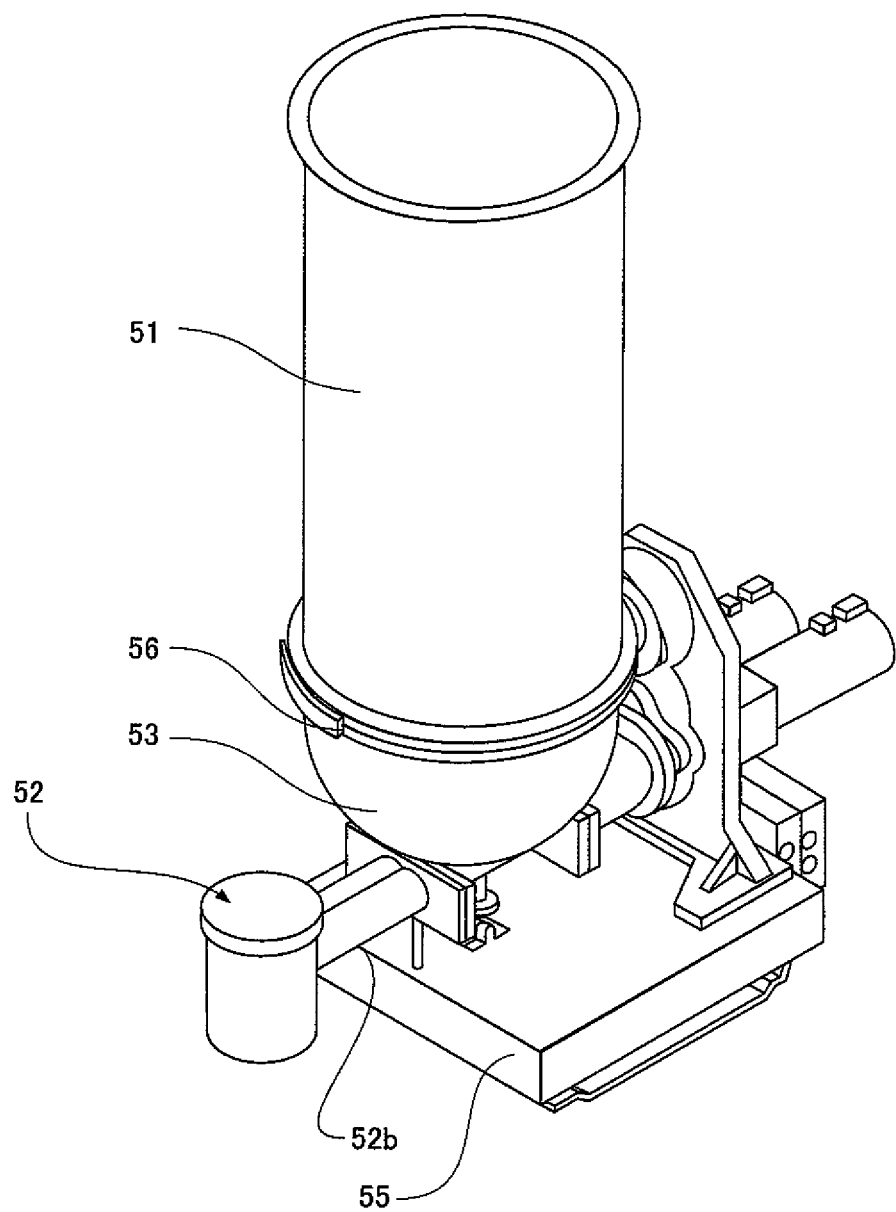
FIG. 20 is a perspective view illustrating a conventional powder/granular material feeding device including a cylindrical hopper and a horizontal agitator (stirring part)
Figure 21:
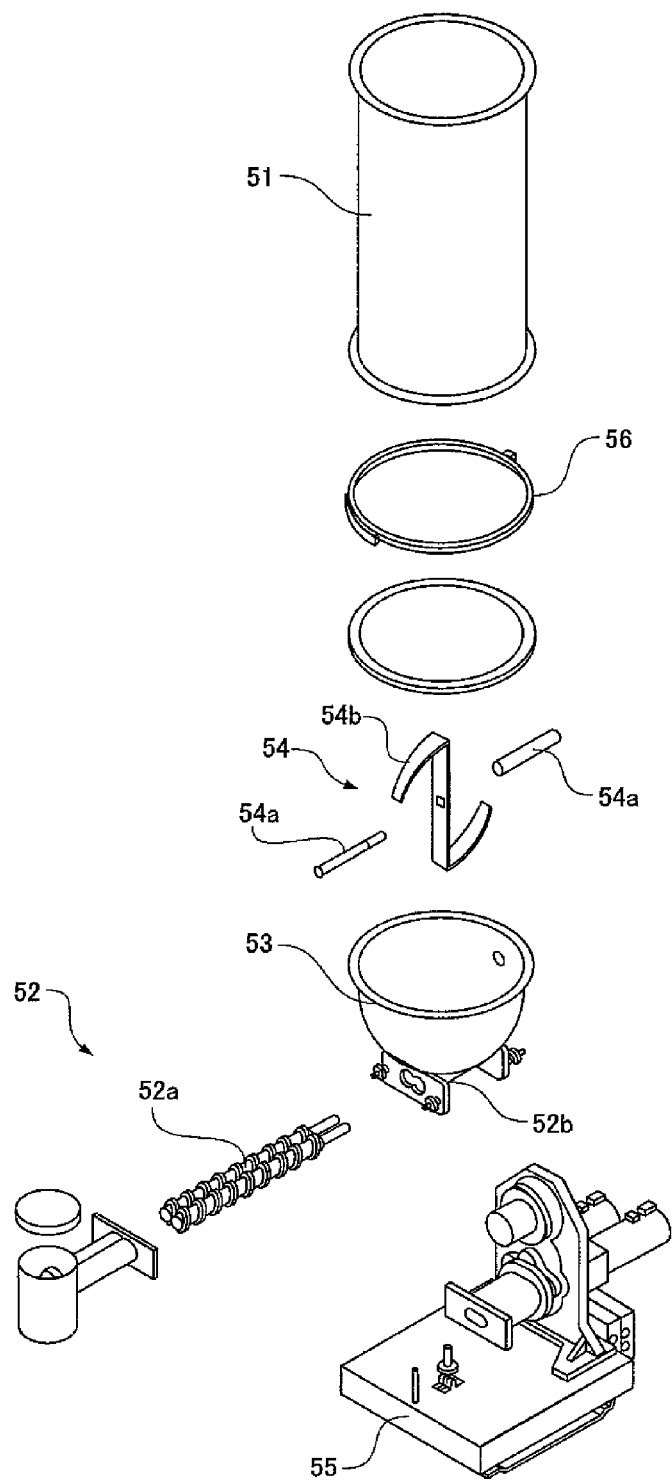
FIG. 21 is an exploded perspective view of the conventional powder/granular material feeding device.
Figure 22:
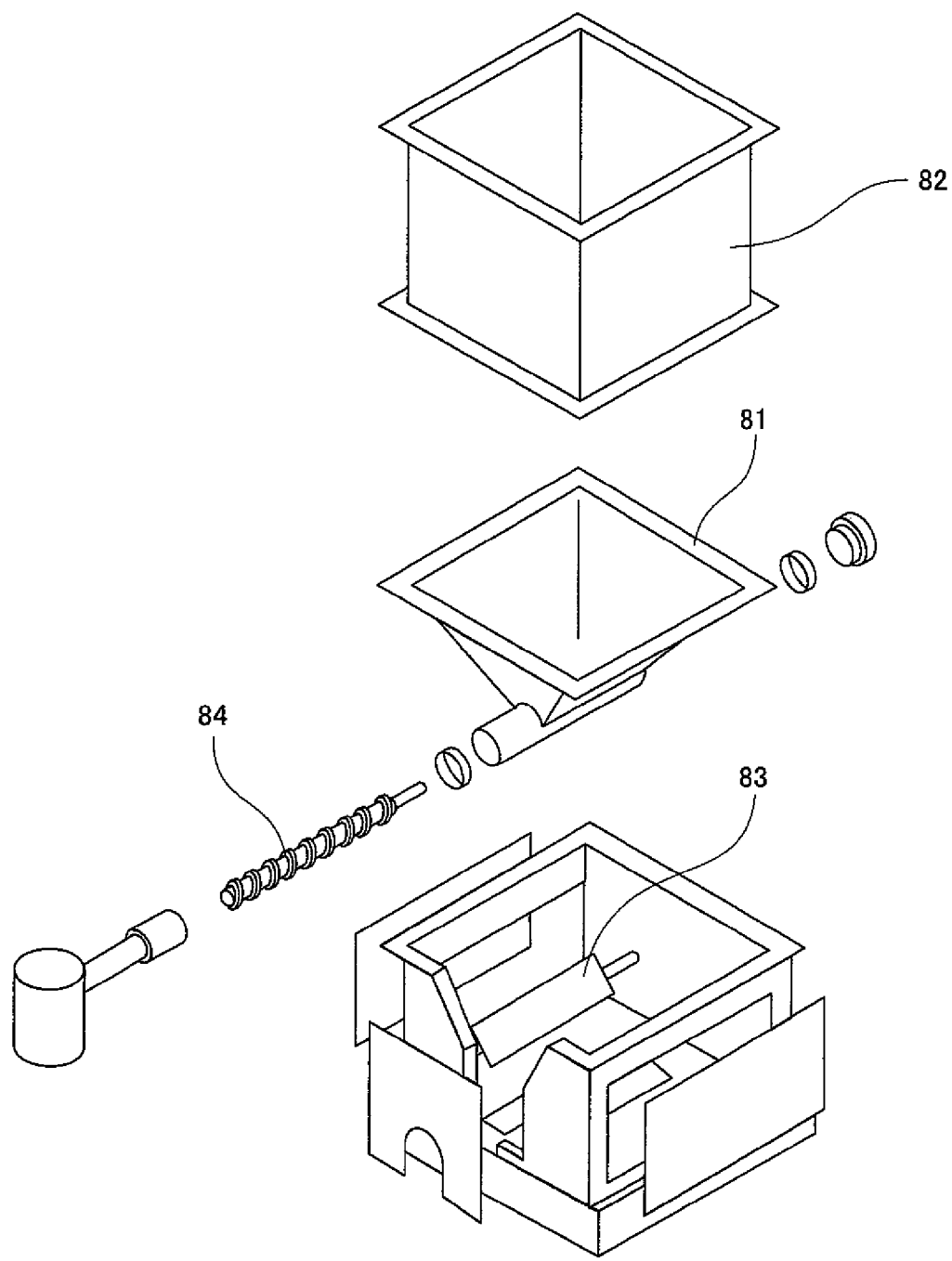
FIG. 22 is an exploded perspective view illustrating another conventional powder/granular material feeding device including a rectangular-prism hopper and a flexible chute.
Figure 23A:
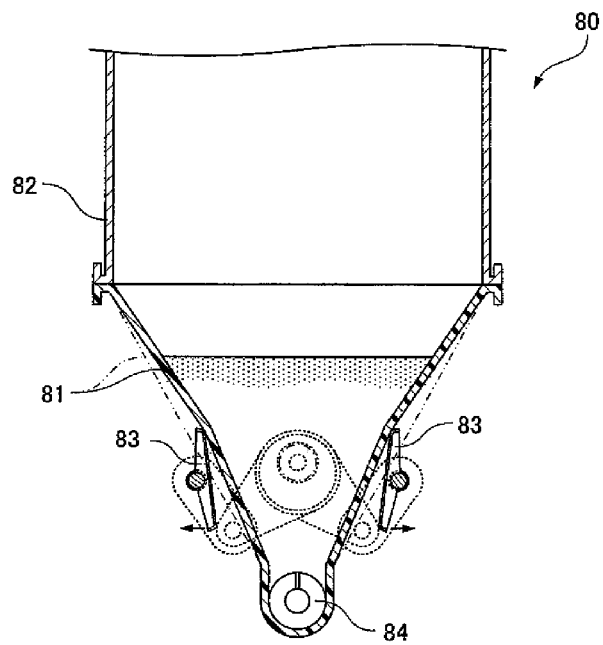
FIG. 23A is a longitudinal section of the other conventional powder/granular material feeding device.
Figure 23B:
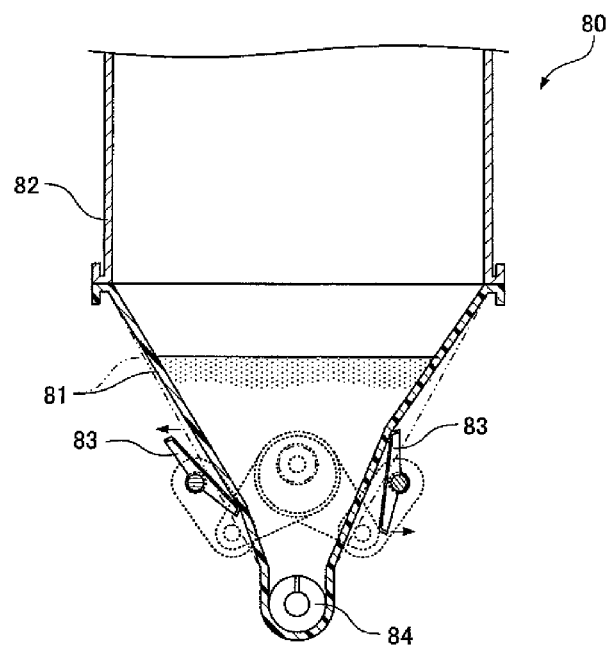
FIG. 23B is a longitudinal section of the other conventional powder/granular material feeding device.
Figure 24:
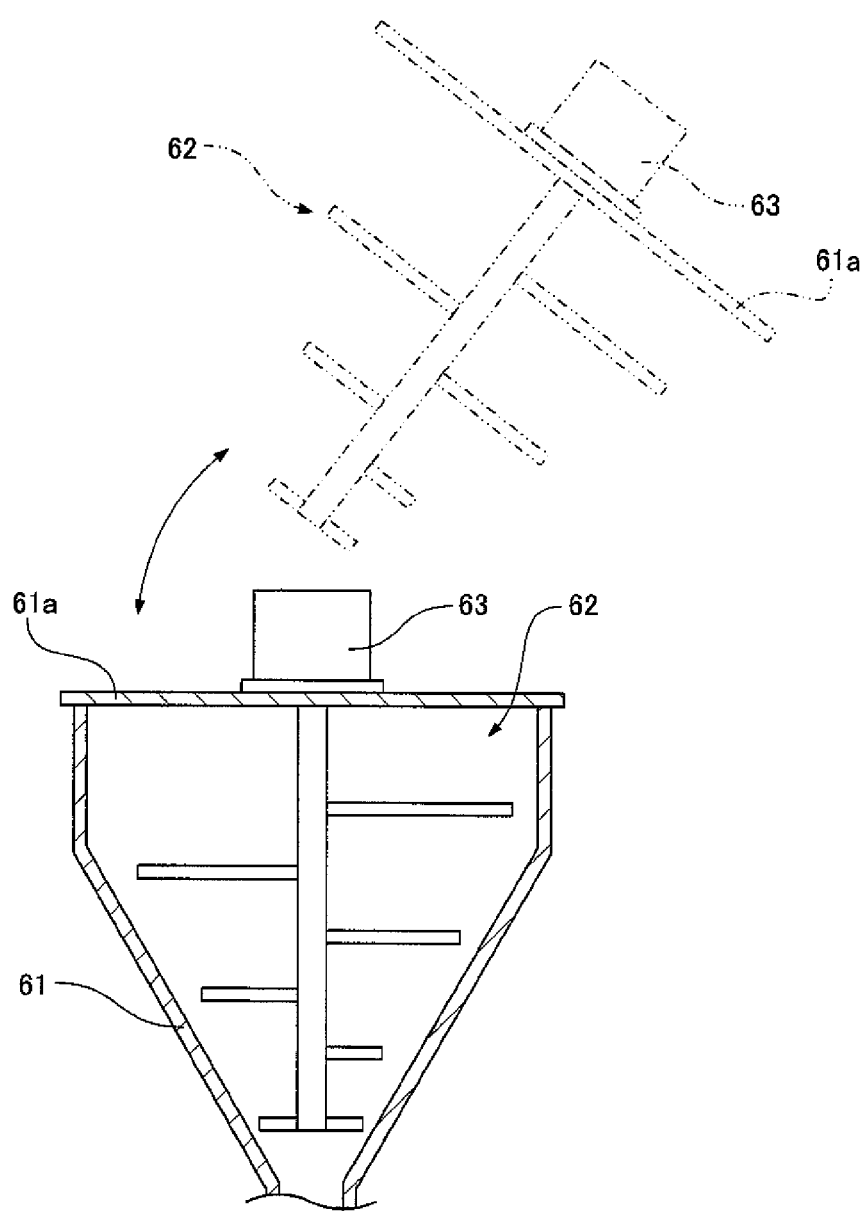
FIG. 24 is a longitudinal section illustrating a conventional hopper agitator including a hopper and a vertical agitator (stirring part), the hopper being inclined so as to expand upward in cross section.
Figure 25:
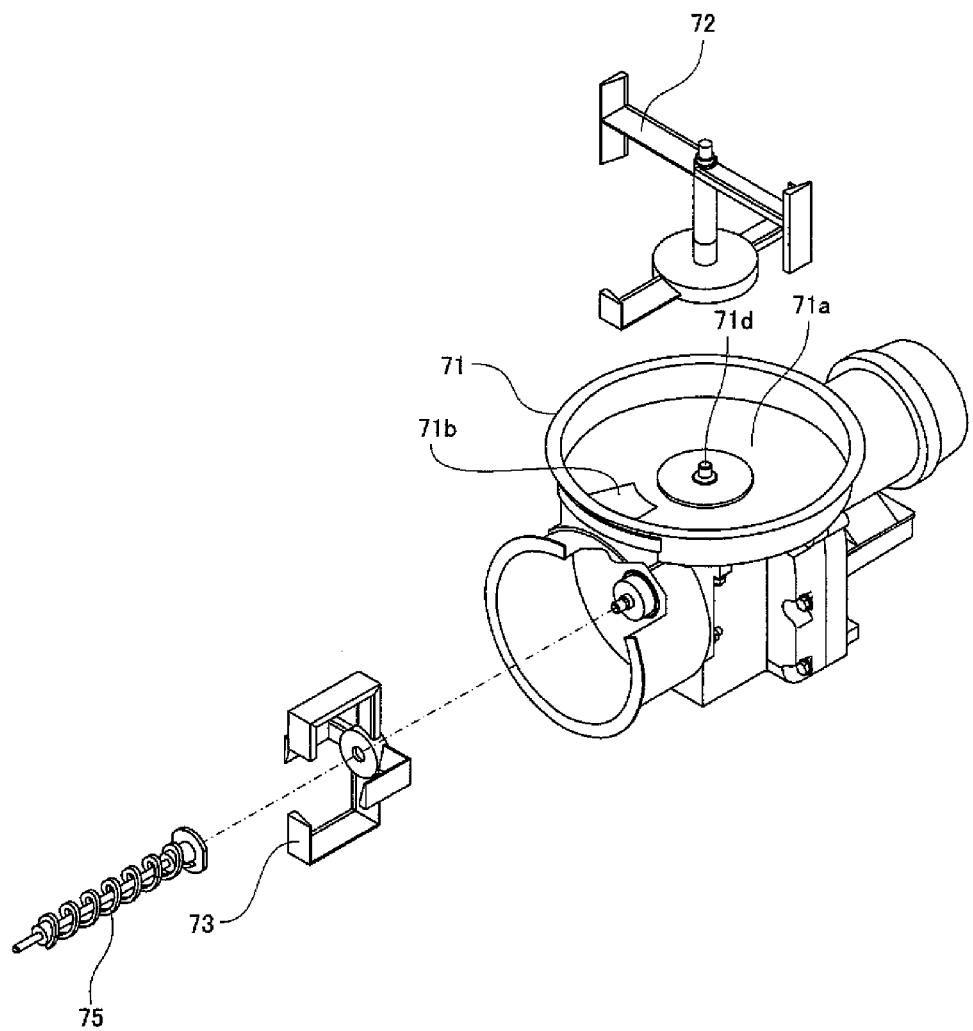
FIG. 25 is a partially exploded perspective view illustrating the principle part of a conventional table-type powder/granular material feeding device.
Figure 26:
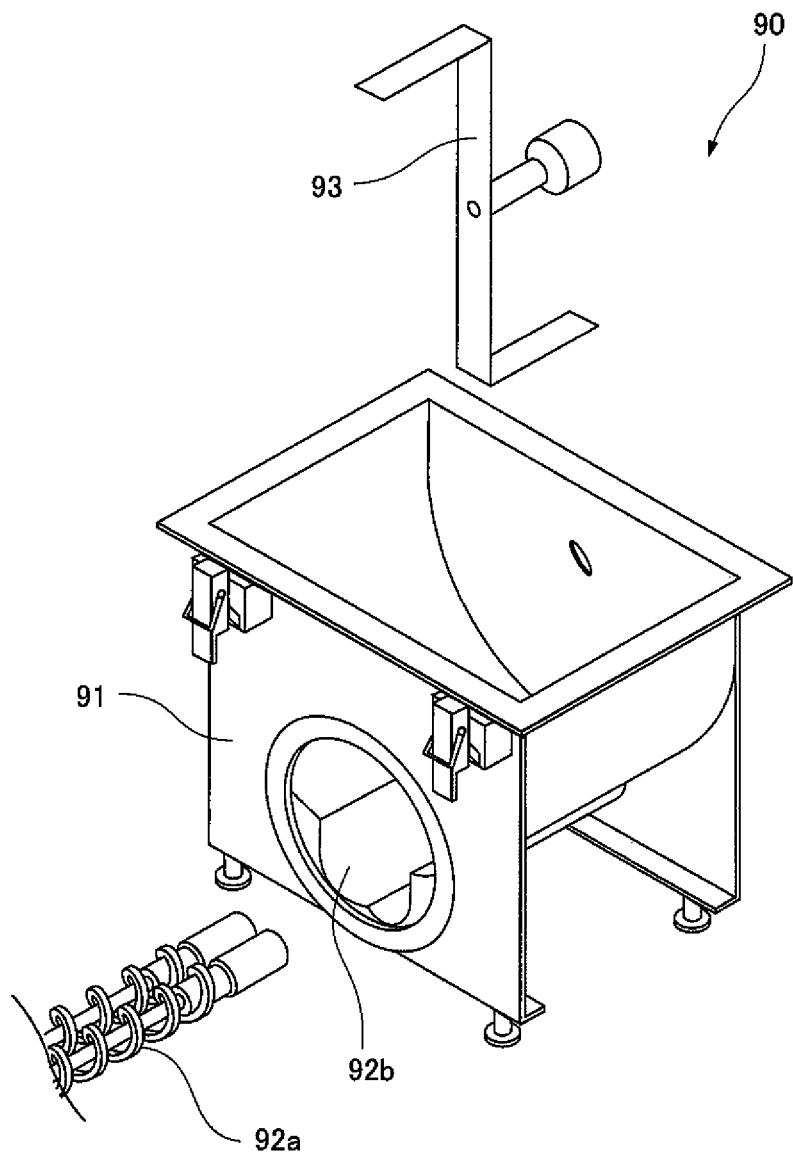
FIG. 26 is a perspective view illustrating a conventional powder/granular material feeding device including a rectangular-prism hopper and a horizontal agitator (stirring part).

The powder/granular material feeding device is similar to the table-type powder/granular material feeding device in FIG. 20 in that the shaft is protruded from a surface near the bottom and rotor blades are provided to rotate about the shaft. However, the powder/granular material feeding device is different from the table-type powder/granular material feeding device in that the rotary stirring members 4*b* can scrape powder/granular material substantially over the inclined plane 3a and the conical wall 3b of the chute 3. Since a space in the screw casing 2e is directly connected to the conical wall 3b of the chute 3, only quite a small amount of powder/granular material is left on the inner surface of the conical wall 3b of the chute 3. Even in the case where powder/granular material is deposited on, for example, the stirring members 4b, the stirring members 4b rotating in a tilted state facilitate falling of powder/granular material, thereby preventing powder/granular material from partially remaining on the stirring members 4b.

The chute 3 including the inclined plane 3a, the conical wall 3b, and the side wall 3c shaped like an oval cylinder can be manufactured by boiler making (also called a welded structure) without using molds. The chute 3 can be manufactured using molds. In this case, the manufacturing cost of the chute 3 can be reduced by high volume production.

Figure 2:
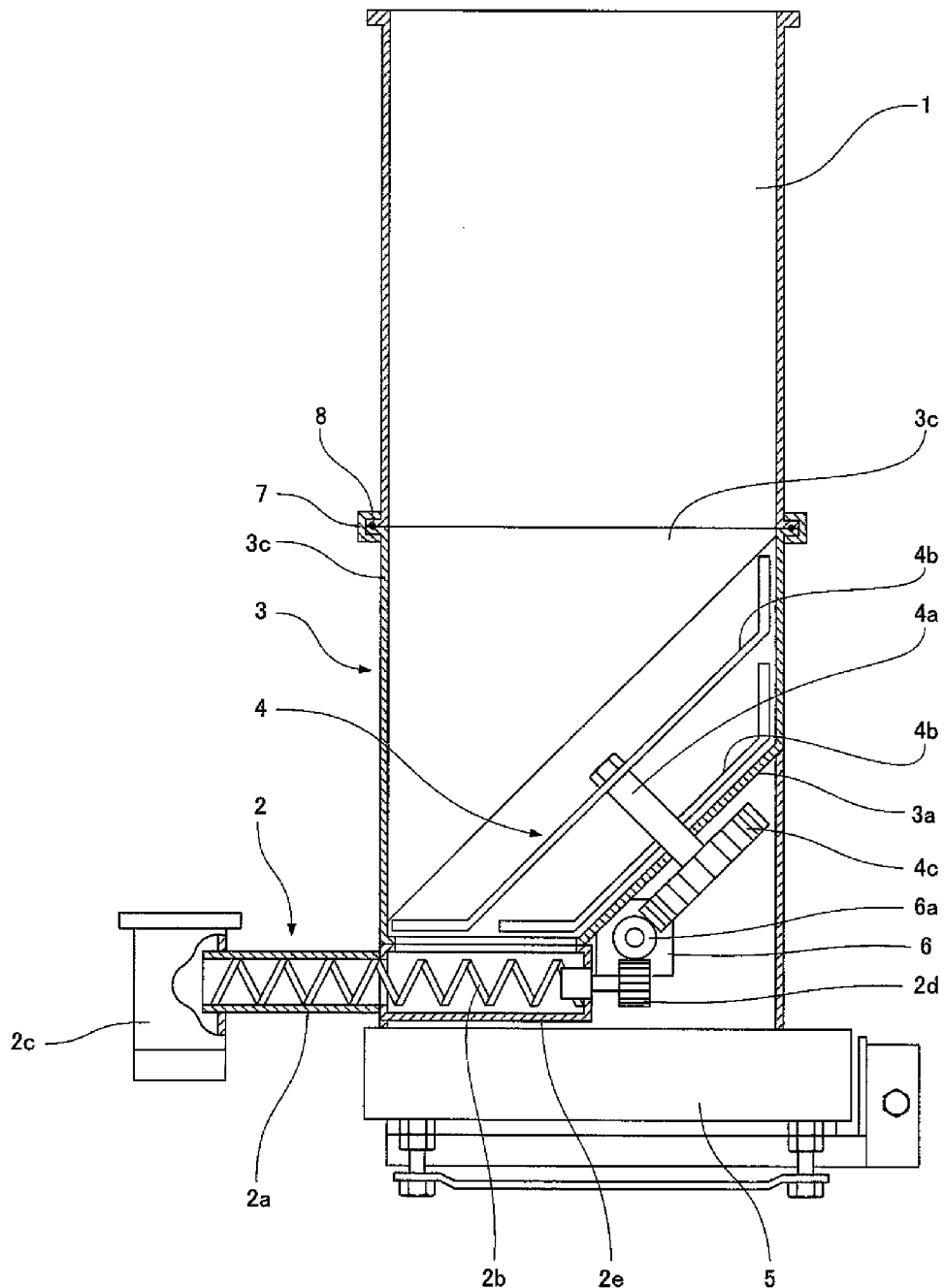
FIG. 2 is a partial cutaway longitudinal side view of the powder/granular material feeding device.
Figure 3:
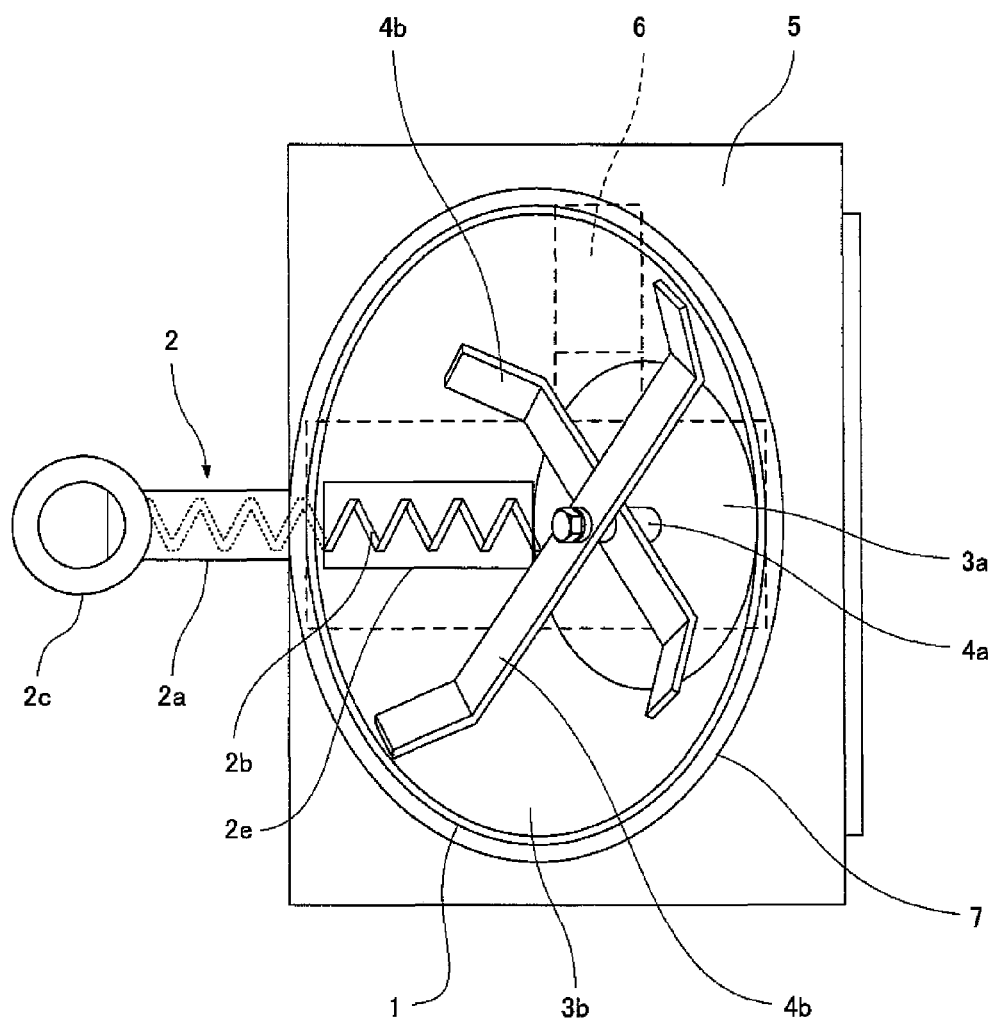
FIG. 3 is a plan view of the powder/granular material feeding device.
Figure 4:
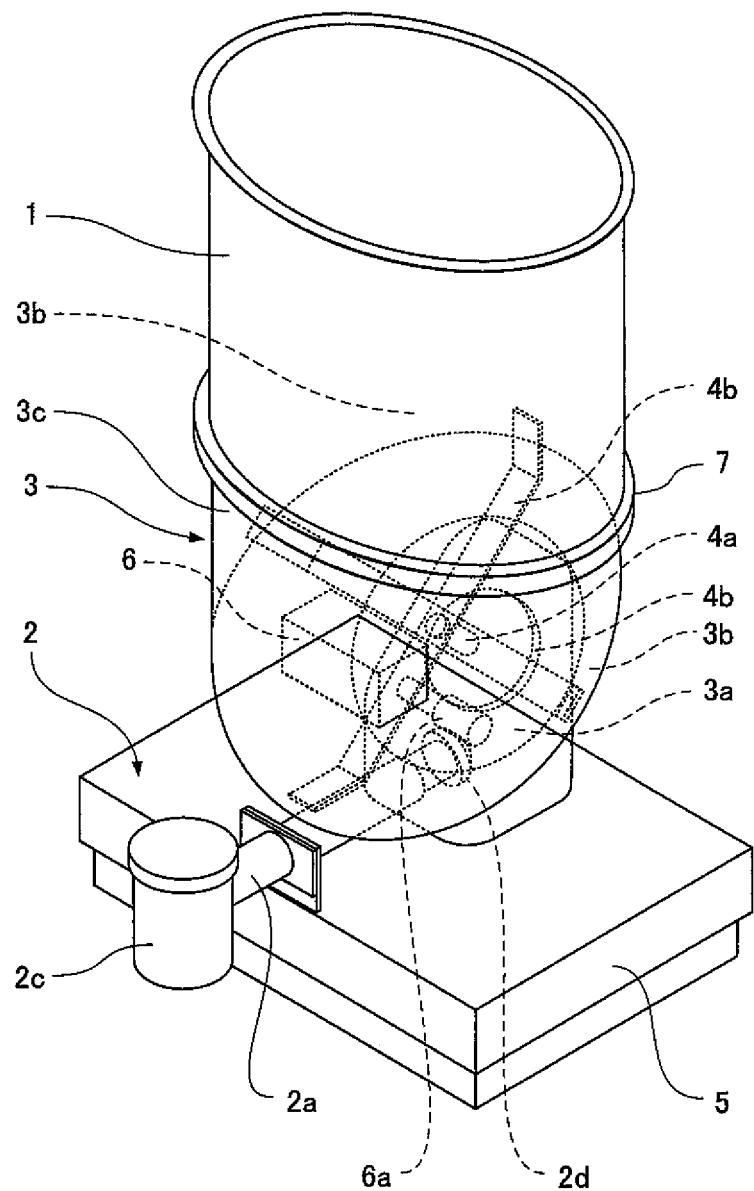
FIG. 4 is a perspective view of the powder/granular material feeding device viewed diagonally from the front.
Figure 5:
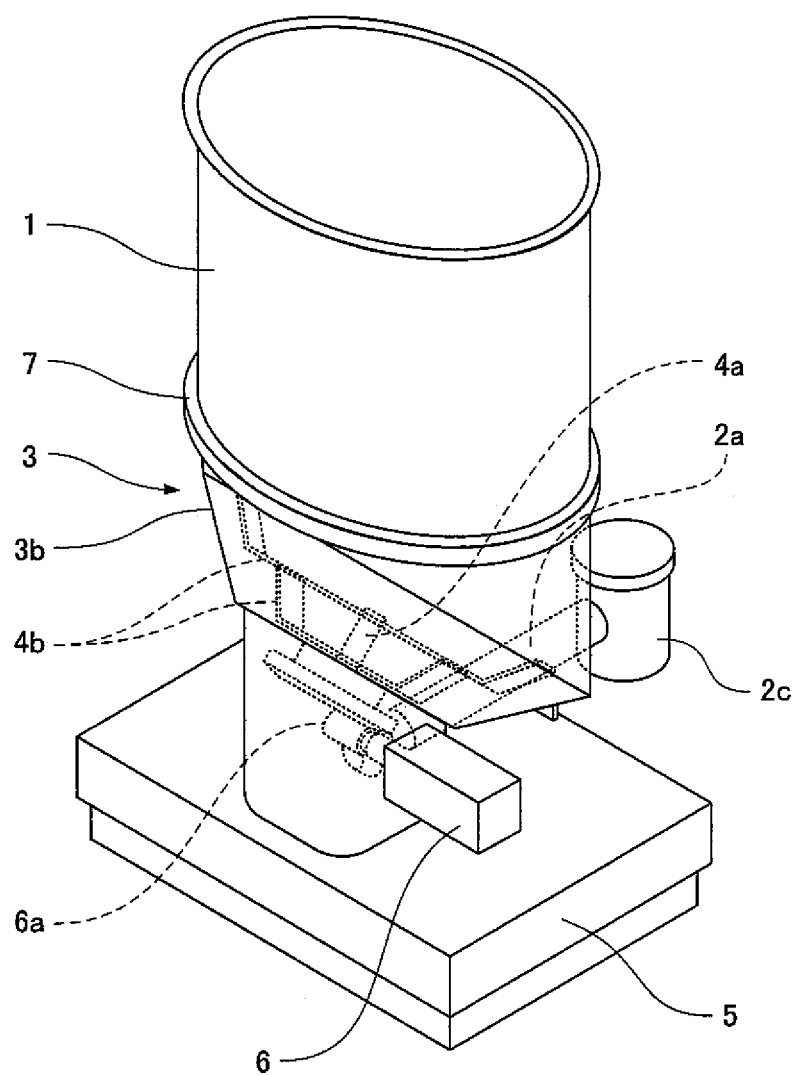
FIG. 5 is a perspective view of the powder/granular material feeding device viewed diagonally from the rear.

As illustrated in FIG. 2, the rear of the lower part of the chute 3 is inclined as if the rear was cut in side view, thereby suppressing the length of the screw 2b. Thus, the end of the screw 2b does not always need to be supported. The manufacturing cost can be reduced by eliminating bearings. Moreover, the screw 2b can be reduced in diameter, allowing the powder/granular material feeding device to be optimally used for feeding a small amount of powder/granular material.

Some of the components of this configuration are similar to those of the table-type powder/granular material feeding device. As illustrated in FIG. 1, the screw 2b can be located at the center of the powder/granular material feeding device in front view. Hence, the inlet and the outlet for powder/granular material fed to the hopper 1 are located on the same straight line, allowing a user to easily create an installation plan of the powder/granular material feeding device with higher convenience.

Furthermore, the shaft 4a protrudes diagonally upward from the inclined plane 3a near the bottom of the chute 3, allowing the stirring members 4b to be sufficiently supported and stably rotated on the base of the shaft 4a. The shaft may be protruded from above to the bottom of the chute 3 such that the stirring blades are fixed on the end of the shaft. In this case, however, the stirring blades attached to the end of the shaft may vibrate the end of the shaft during rotations and cause unstable rotations of the stirring blades. In contrast, in the present embodiment, the stirring members 4b for agitation near the bottom of the chute 3 can be particularly sufficiently supported on the base of the shaft 4a, so that the stirring members 4b can be stably rotated.

The shaft 4a of the stirring part 4 is protruded perpendicularly to the inclined plane 3a, thereby relatively easily constructing a seal structure of the inclined plane 3a of the chute 3 and the shaft 4a of the stirring part 4. This configuration can reduce the manufacturing cost.

Figure 6:
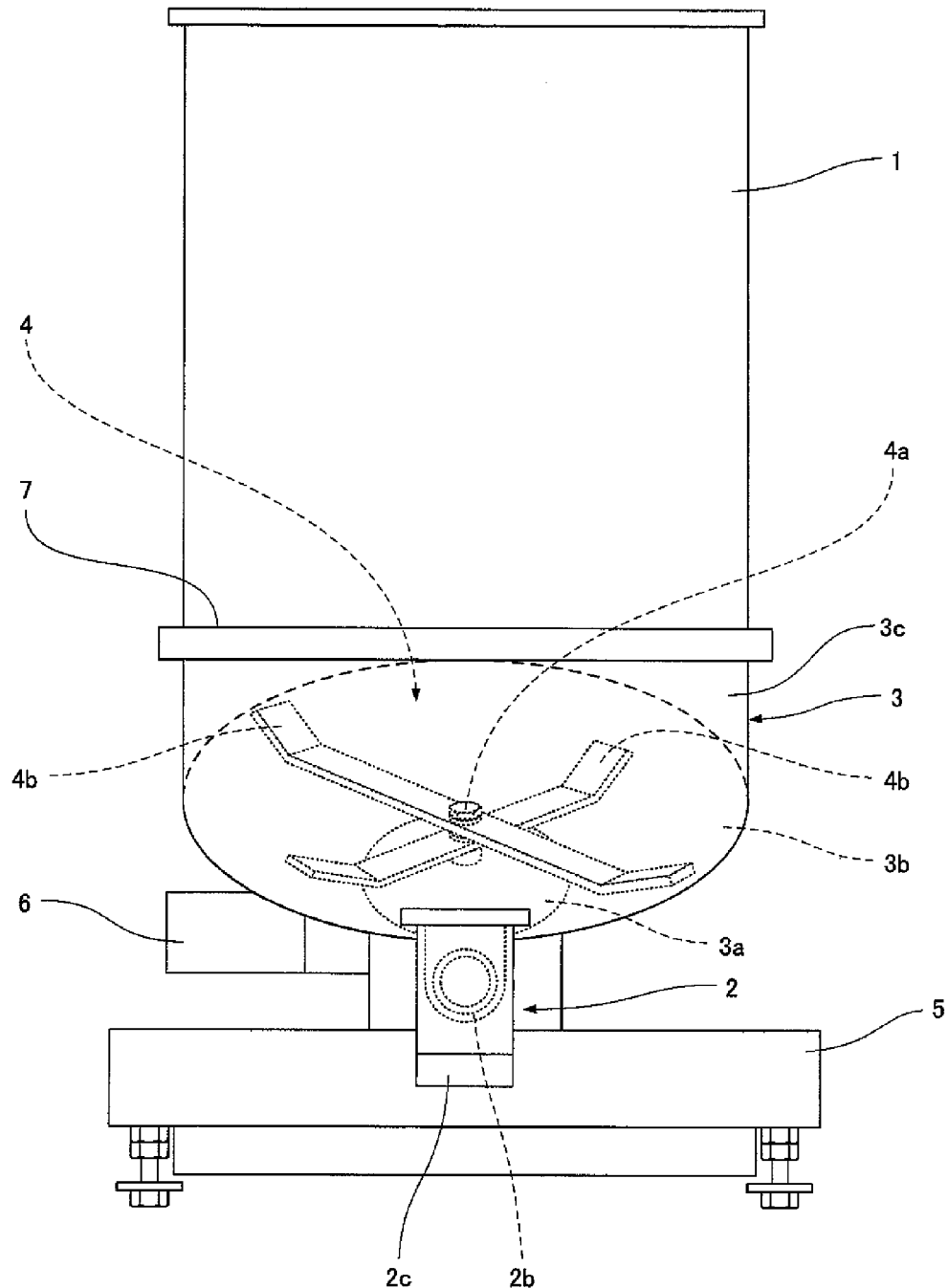
FIG. 6 is a front view illustrating a powder/granular material feeding device according to a second embodiment of the present invention.
Figure 7:
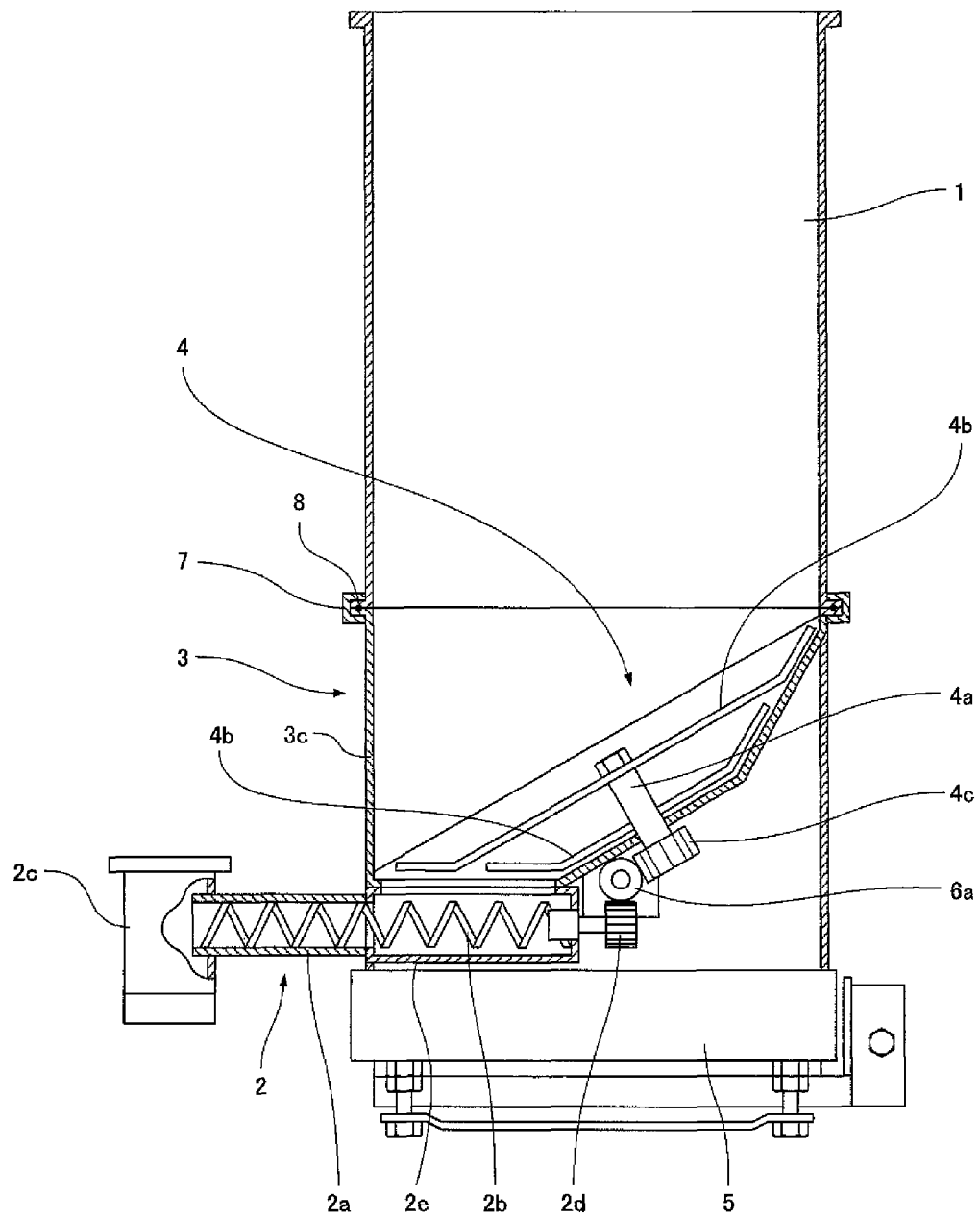
FIG. 7 is a partial cutaway longitudinal side view of the powder/granular material feeding device.
Figure 8:
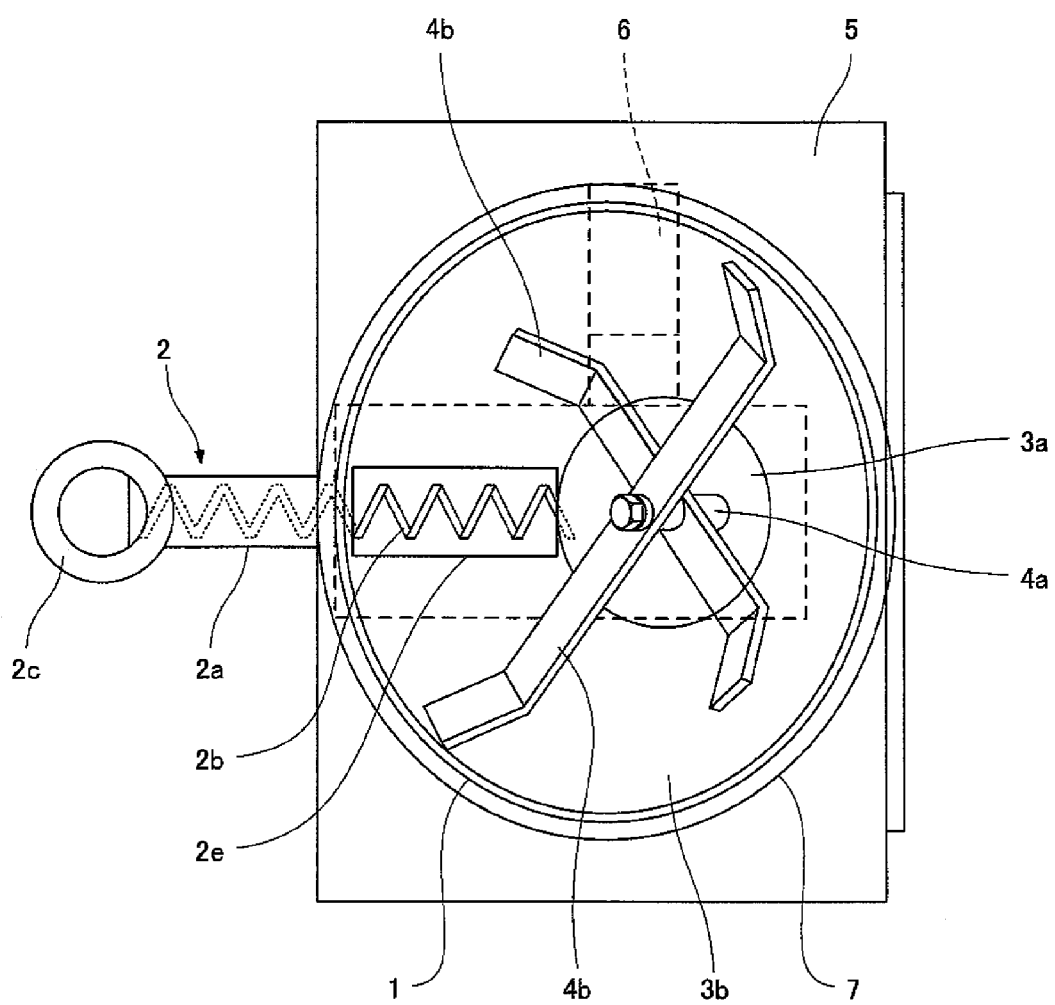
FIG. 8 is a plan view of the powder/granular material feeding device.

In the present embodiment, the inclined plane 3a of the chute 3 is inclined at 45° with respect to a horizontal line or the conveyance line of the screw 2b in side view, and the shaft 4a protrudes perpendicularly to the inclined plane 3a. In this case, the stirring members 4b can sufficiently agitate powder/granular material in the vertical direction and particularly, in the circumferential direction. The inclination angle of the inclined plane 3a is not limited to 45°. As illustrated in FIGS. 6 to 8, a shaft 4a may be inclined at more than 45°, for example, 60° with respect to a horizontal line or may be inclined at less than 45°, for example, 30° (not shown) with respect to the horizontal line (a powder/granular material feeding device according to a second embodiment of the present invention).

Figure 9:
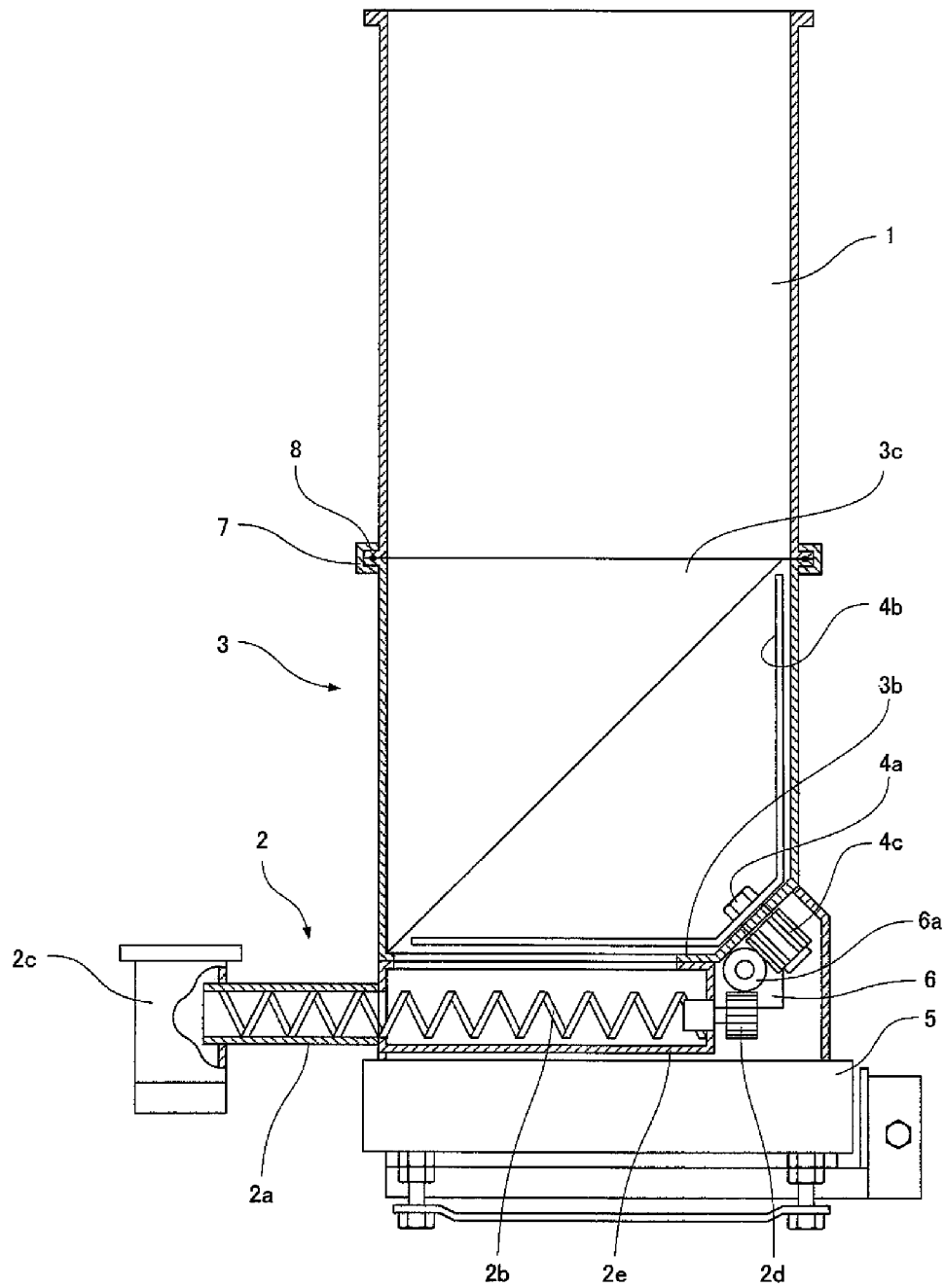
FIG. 9 is a partial cutaway longitudinal side view illustrating a powder/granular material feeding device according to a third embodiment of the present invention.

In the above-described embodiment, the relatively large inclined plane 3a is formed in the rear of the lower part of the chute 3. The present invention is not limited to this configuration. As illustrated in FIG. 9, a shaft 4a may protrude diagonally upward substantially from a corner in the rear of the lower part of a chute 3 such that stirring members 4b rotate about the shaft 4a along a conical wall 3b of the chute (a powder/granular material feeding device according to a third embodiment of the present invention).

Figure 10:
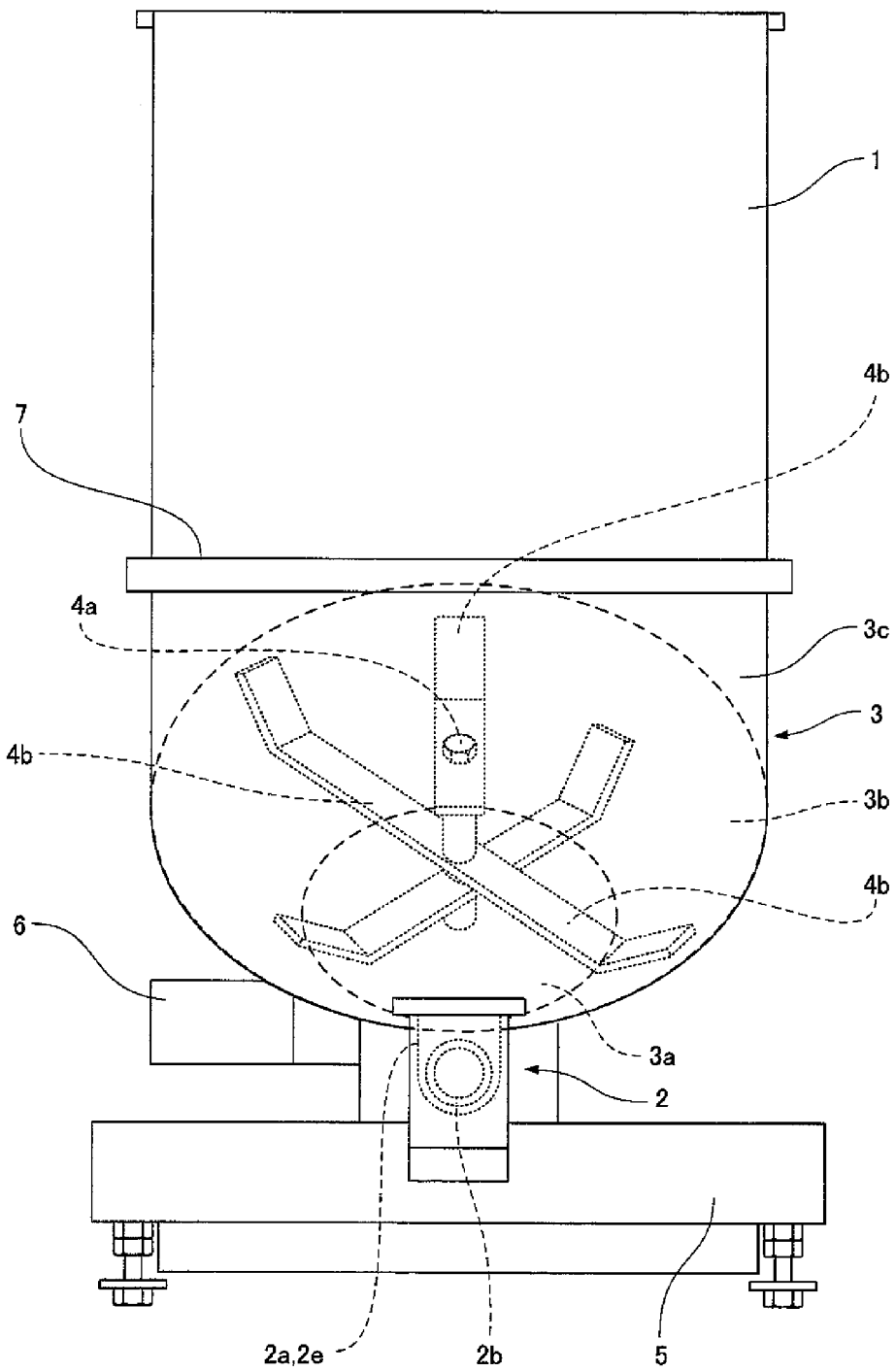
FIG. 10 is a front view illustrating a powder/granular material feeding device according to a fourth embodiment of the present invention.
Figure 11:
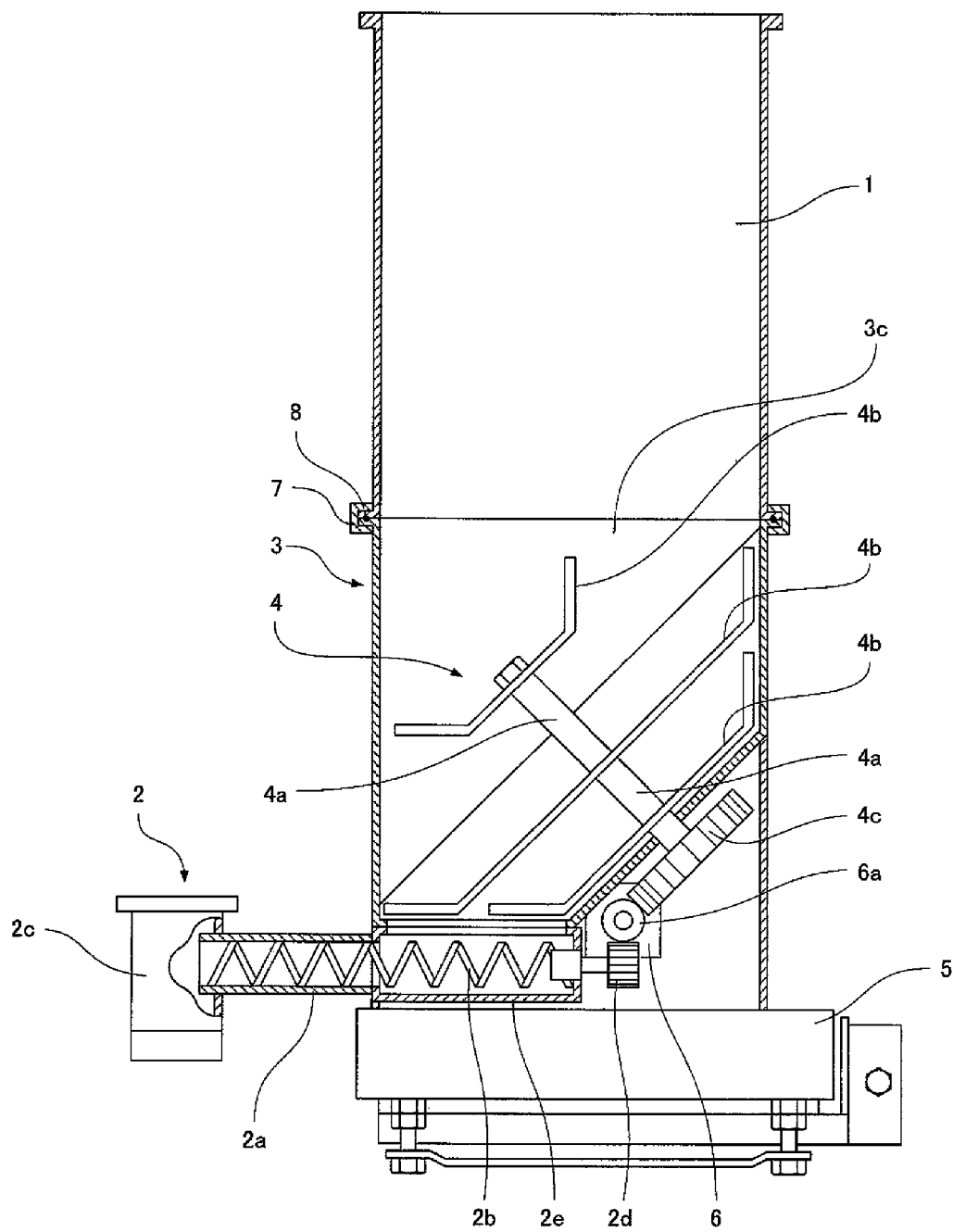
FIG. 11 is a partial cutaway longitudinal side view of the powder/granular material feeding device.

In the above-described embodiment, the stirring members 4b of the stirring part 4 are extended from two points: the base and end of the shaft 4a. The present invention is not limited to this configuration. As illustrated in FIG. 9, the stirring members 4b may be extended to two sides from a point of the shaft 4a. Alternatively, as illustrated in FIGS. 10 and 11, a shaft 4a may be further protruded upward with stirring members 4b provided at three points (or at least three points). Moreover, in the above-described embodiment, the stirring members 4b are extended in the radial direction. The present invention is not limited to this configuration. The stirring members 4b provided at any intervals in a circumferential direction may be extended in multiple directions (at least three directions, a powder/granular material feeding device according to a fourth embodiment of the present invention).

Figure 12:
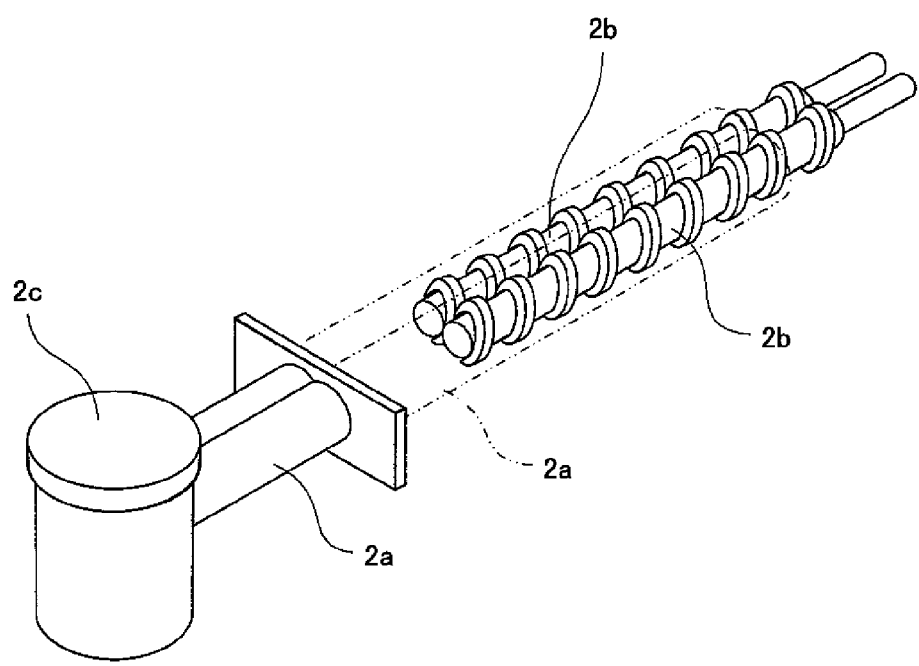

In the drawings of the above-described embodiments, the single screw 2b is illustrated. As has been discussed, double screws 2b in FIG. 12 may be optionally disposed instead.

In the above-described embodiment, the driving force transmission mechanism including the worm gear 6a, the stirring part gear 4c, and the outlet gear 2d is provided to transmit the driving force of the single motor 6 to the screw 2b of the outlet portion 2 and the stirring part 4. The screw 2b of the outlet portion 2 and the stirring part 4 are driven through the driving force transmission mechanism. This configuration only requires the single motor, advantageously reducing the manufacturing cost.

Figure 13:
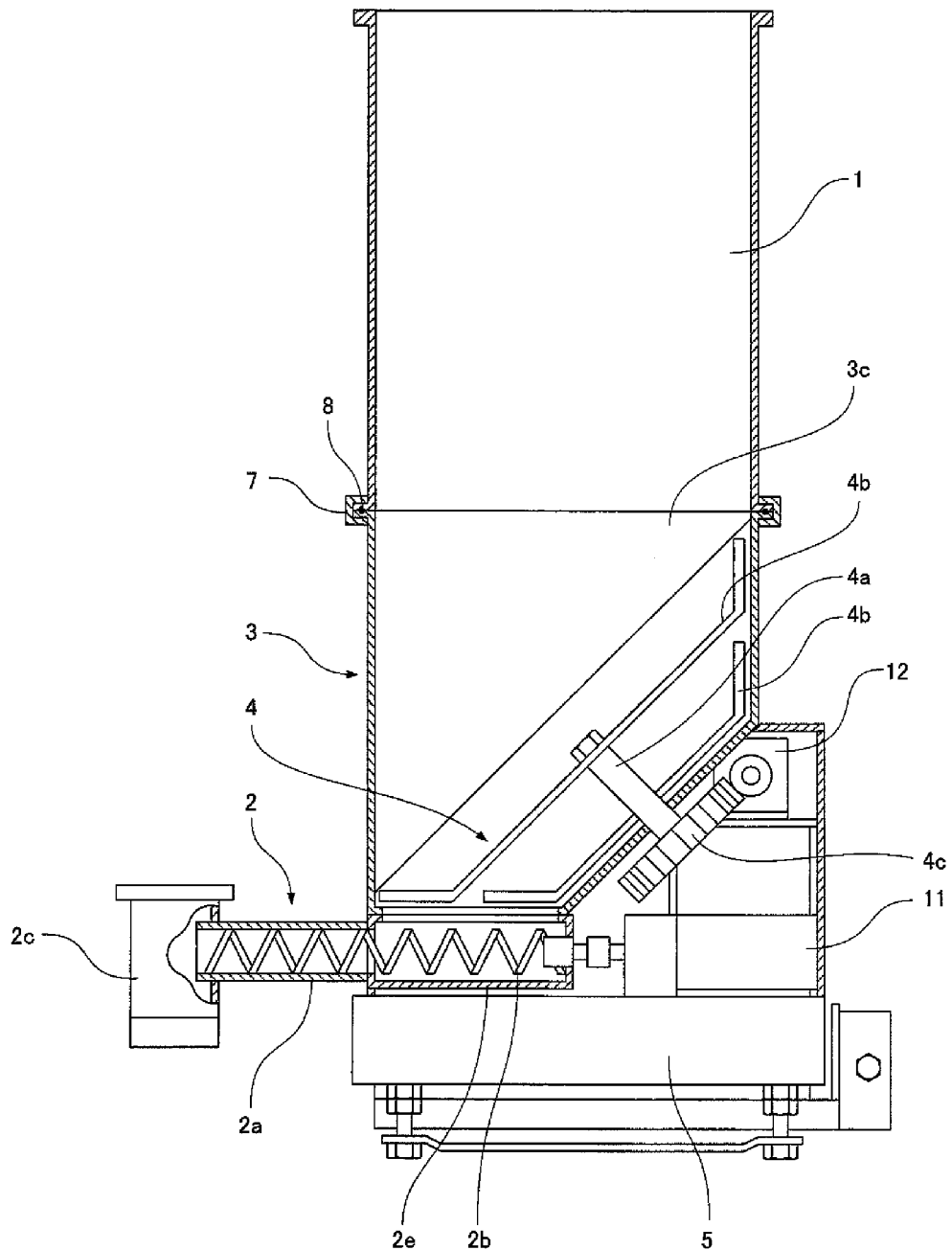
FIG. 13 is a partial cutaway longitudinal side view illustrating a powder/granular material feeding device according to a fifth embodiment of the present invention.

The present invention is not limited to this configuration. As illustrated in FIG. 13, a motor 11 for rotating a screw 2b of an outlet portion 2 and a motor 12 for rotating a stirring part 4 may be separately provided (a powder/granular material feeding device according to a fifth embodiment of the present invention). In this case, the number of motors 11 and 12 leads to higher manufacturing cost. However, the screw 2b of the outlet portion 2 and the stirring part 4 can be separately driven or controlled with different adjusted rotation speeds.

Figure 14:
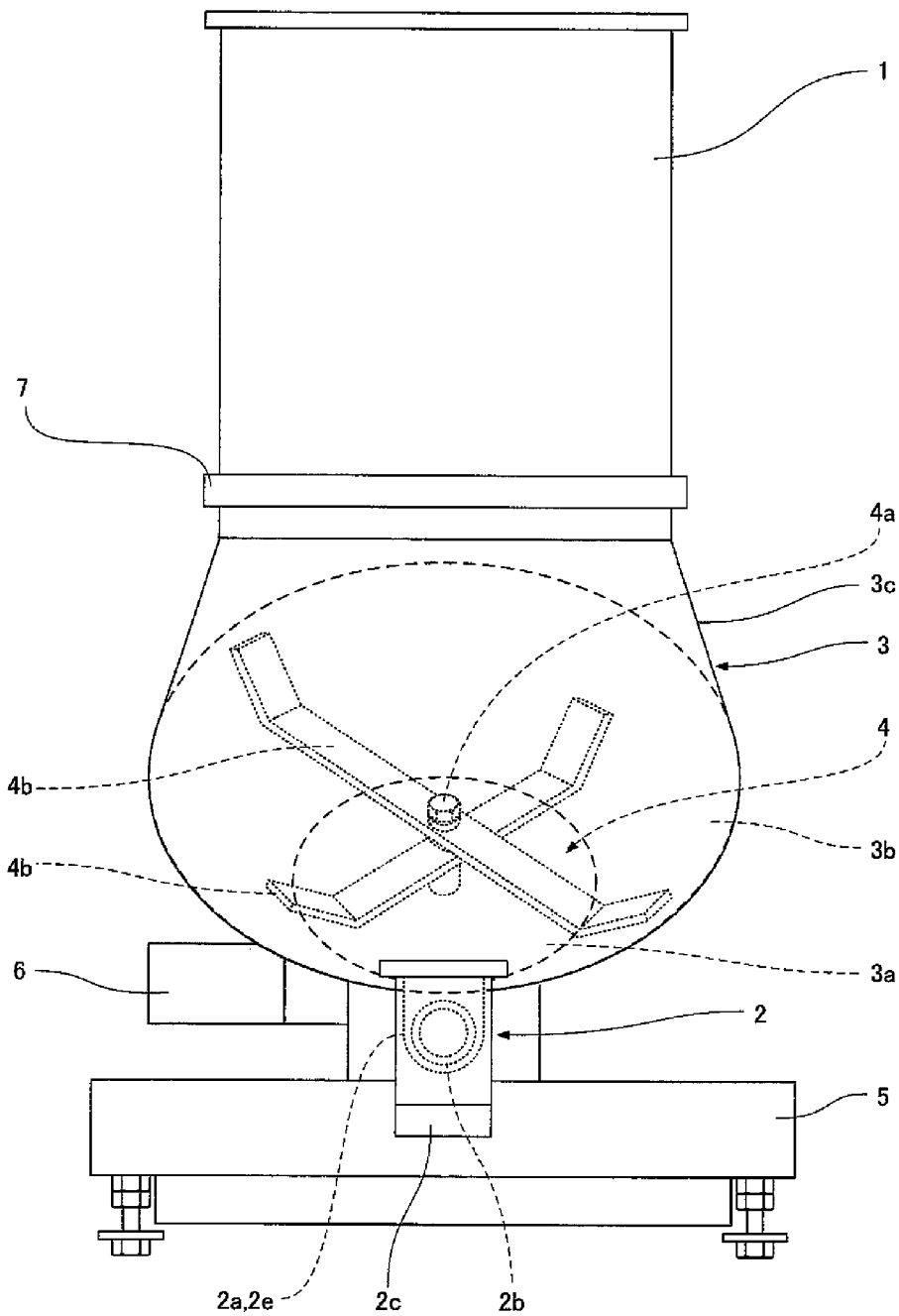
FIG. 14 is a front view illustrating a powder/granular material feeding device according to a sixth embodiment of the present invention.
Figure 15:
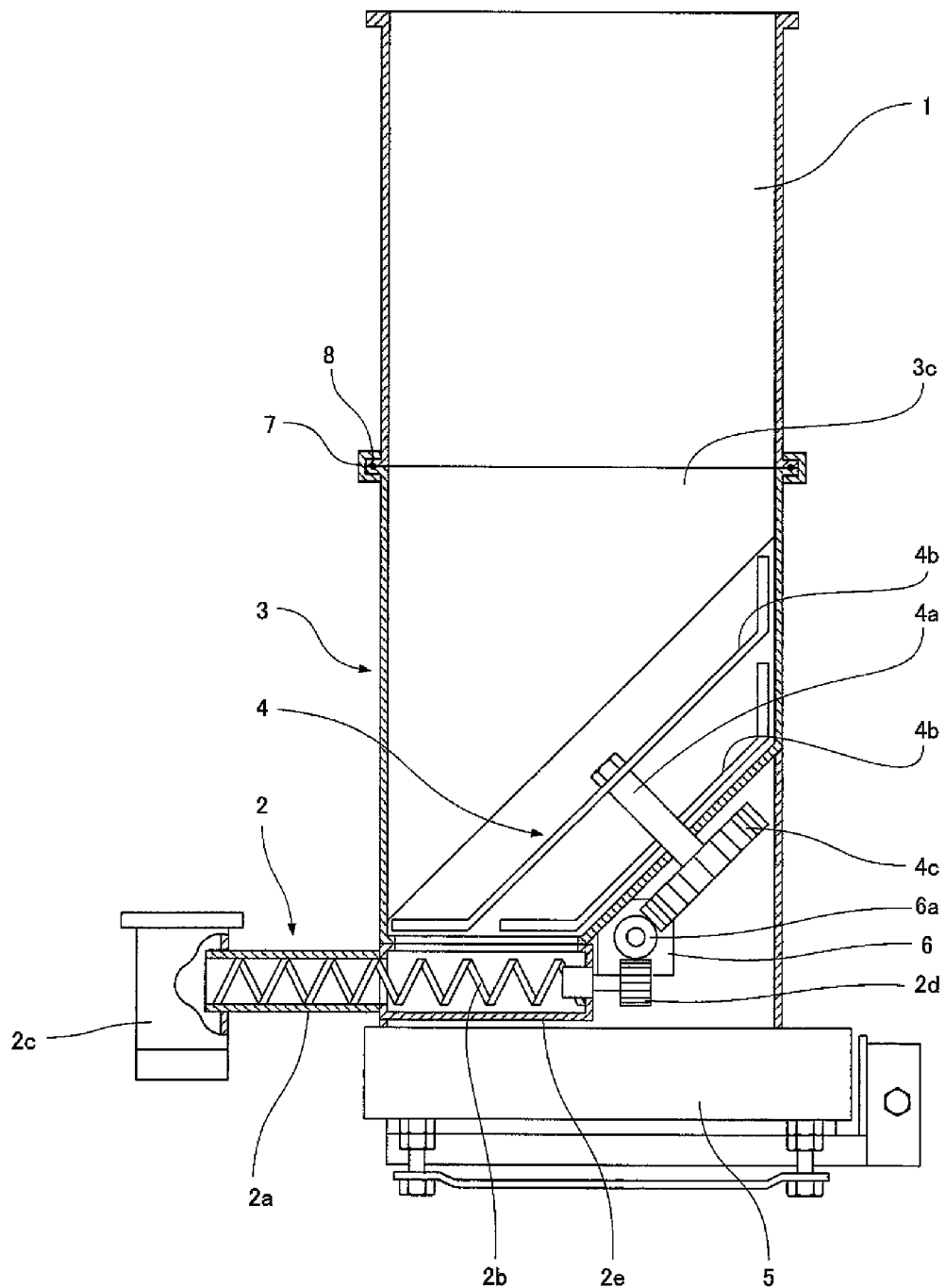
FIG. 15 is a partial cutaway longitudinal side view of the powder/granular material feeding device.
Figure 16:
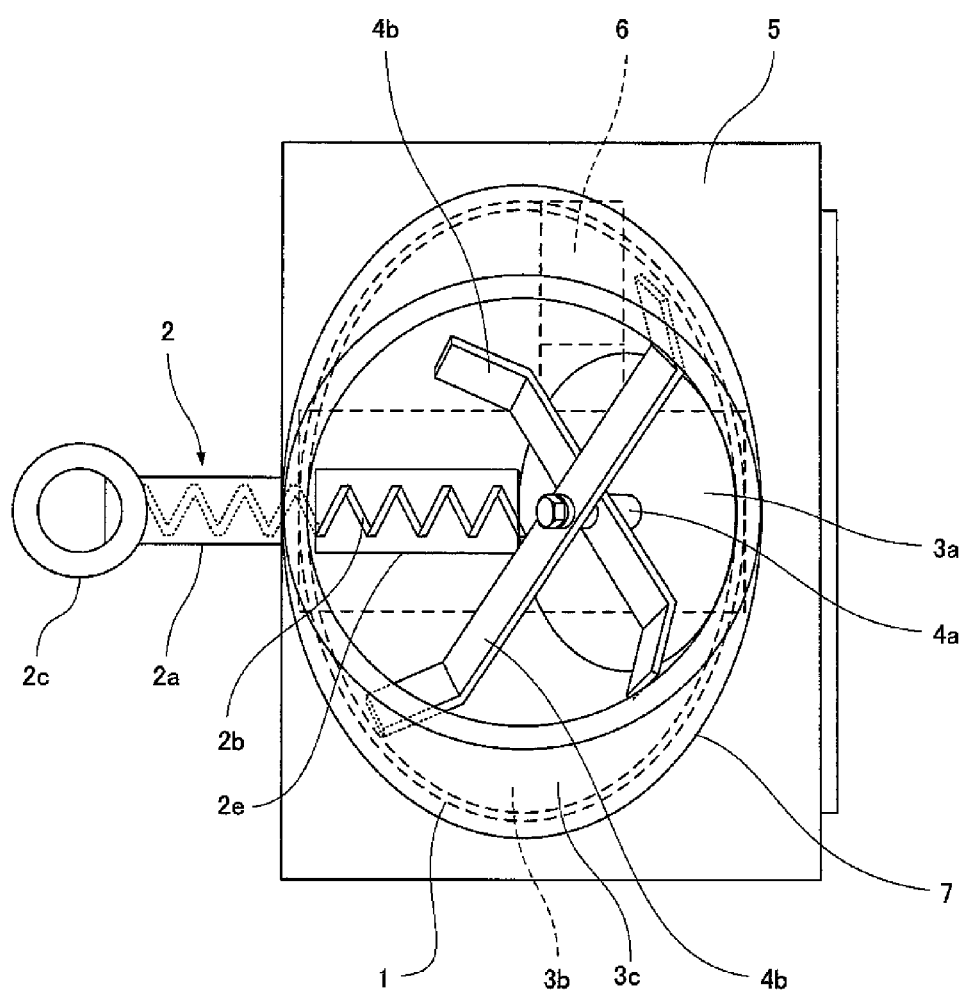
FIG. 16 is a plan view of the powder/granular material feeding device.
Figure 17:
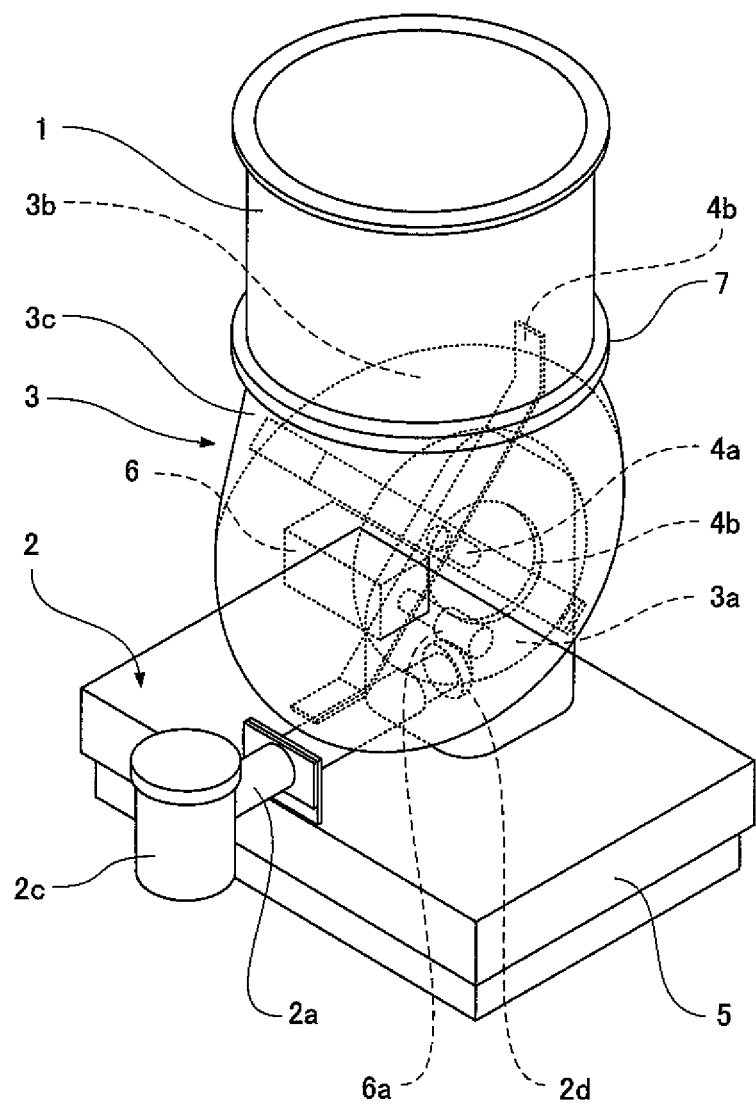
FIG. 17 is a perspective view of the powder/granular material feeding device viewed diagonally from the front.
Figure 18:
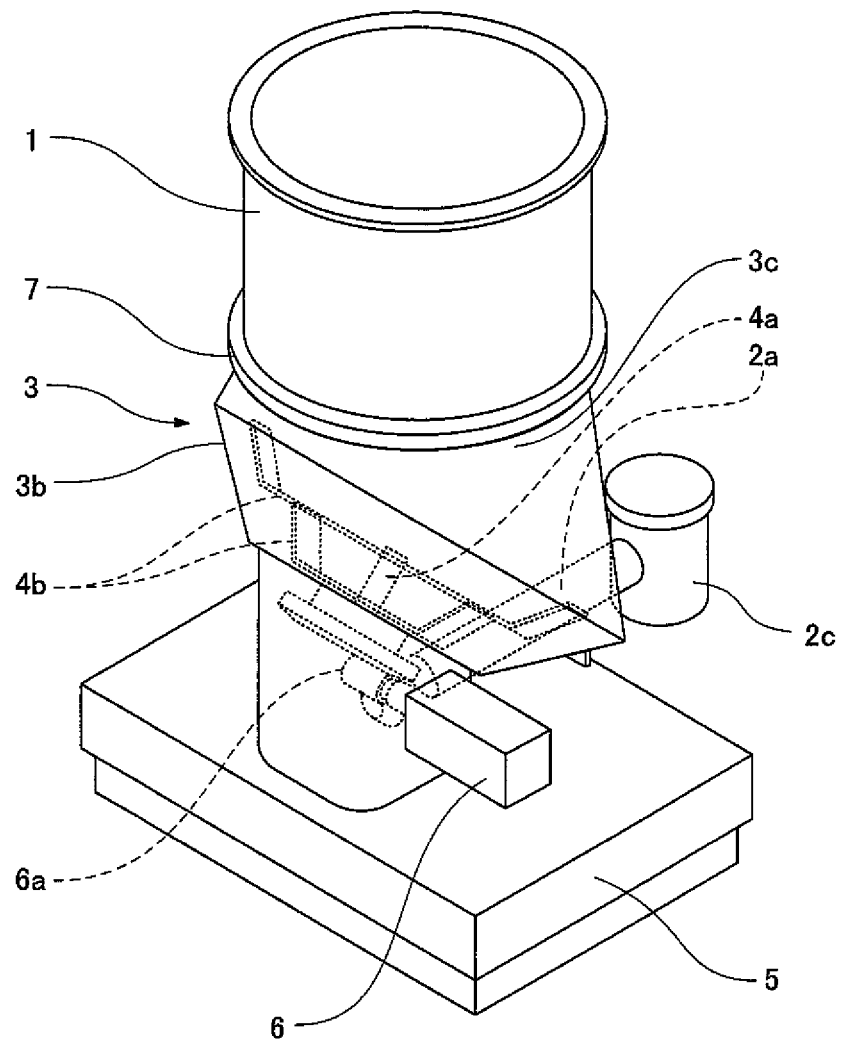
FIG. 18 is a perspective view of the powder/granular material feeding device viewed diagonally from the rear.

In these embodiments, the side wall 3c of the chute 3 is oval in plan view and has a constant cross-sectional shape in the vertical direction. The present invention is not limited to this configuration. FIGS. 14 to 18 illustrate a powder/granular material feeding device according to a sixth embodiment of the present invention. As illustrated in these drawings, a side wall 3c of a chute 3 in the powder/granular material feeding device expands in the lower part of the chute in cross section relative to the upper part. As illustrated in FIG. 14 and so on, in the powder/granular material feeding device, the left side wall 3c and the right side wall 3c of the chute 3 expand in the lower part of the chute in front view. As illustrated in FIG. 15, the side wall 3c on the front end and the side wall 3c on the rear end are formed like vertical straight lines in side view. The side walls 3c are seamlessly connected in circumferential and vertical directions. Moreover, in the present embodiment, the upper end of the side wall 3c of the chute 3 is circular in plan view (perfect circle) and a hopper 1 is a cylinder (perfect circle) as large as the upper end of the side wall 3c of the chute 3. The hopper 1 has a constant cross-sectional shape in the vertical direction.

With this configuration, the side wall 3c of the chute 3 expands in the lower part of the chute in cross section relative to the upper part. Thus, powder/granular material introduced from the hopper 1 into the chute 3 is hardly compressed, so that a pressure on the side wall 3c of the chute 3 decreases and powder/granular material deposited on the side wall 3c is likely to fall off the side wall 3c by its own weight. This configuration can satisfactorily prevent powder/granular material deposition on the side wall 3c of the chute 3. Since the hopper 1 and the upper end of the chute 3 are circular in plan view, a degree of curving is kept constant but is not locally increased unlike in the case of an oval shape in plan view, thereby satisfactorily preventing powder/granular material deposition on the side wall 3c of the chute 3. This configuration can prevent the occurrence of bridges in the chute 3 with higher reliability, stabilize the weight of powder/granular material discharged from the powder/granular material feeding device, and stabilize the rate of filling into a screw 2b of an outlet portion 2 provided under the chute 3, thereby improving the accuracy of feeding and reliability of the powder/granular material feeding device.

In this configuration, the hopper 1 and the upper end of the chute 3 are circular in plan view. Thus, the hopper 1 can be more easily formed than the oval hopper 1. Furthermore, the hopper 1 and the chute 3 can be connected to each other with a simple structure, and the hopper can be also connected to other members with a simple structure, thereby reducing the manufacturing cost.

Figure 19:
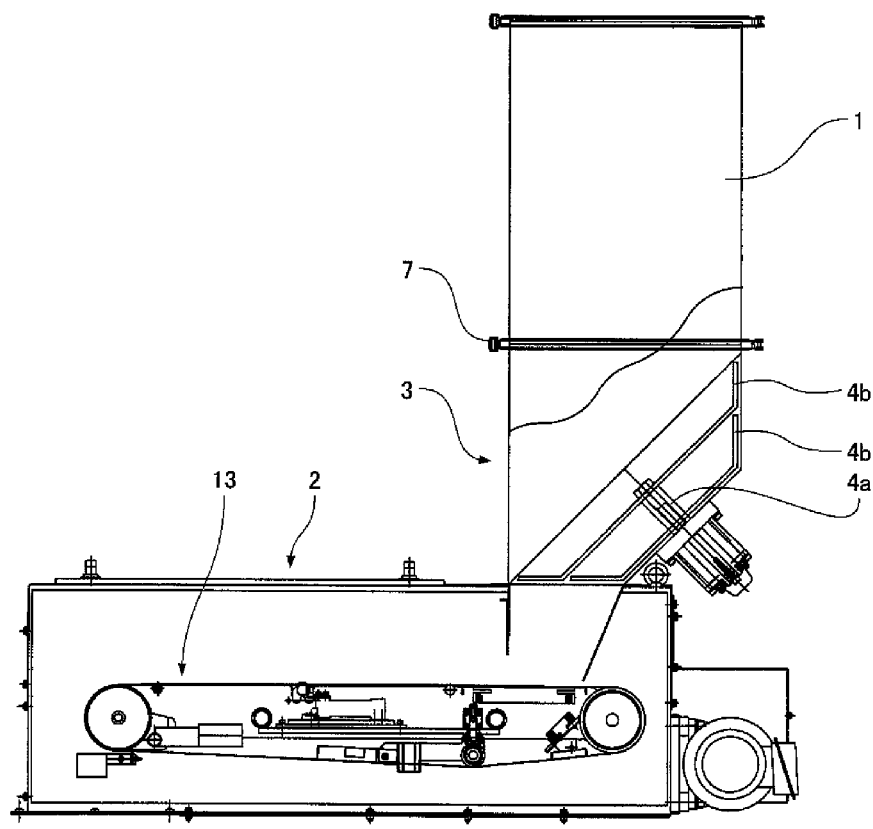
FIG. 19 is a partial cutaway side view illustrating a powder/granular material feeding device according to a seventh embodiment of the present invention.

In the present embodiment, the powder/granular material feeding device is a screw feeder including the screw 2b provided in the outlet portion 2. The present invention is not limited to this configuration. As illustrated in FIG. 19, the outlet portion 2 may be a feeder device including a belt-type feeder 13 (a powder/granular material feeding device according to a seventh embodiment of the present invention). The present invention is also applicable to a powder/granular material feeding device including an outlet portion with an on-off valve.

Having described the invention, the following is claimed:

1. A powder/granular material feeding device comprising:
   a hopper that receives powder/granular material;
   an outlet portion that discharges powder/granular material;
   a chute that guides, into the outlet portion, powder/granular material dropped from the hopper; and
   a stirring part that rotates a stirring member about a shaft protruding so as to tilt diagonally upward from a lower part of an interior of the chute,
   wherein the chute includes an inclined plane with an inner surface inclined diagonally upward, a conical wall extended from an outer periphery of the inclined plane, and a side wall that connects the conical wall and the hopper to guide powder/granular material in the hopper to the conical wall of the chute,
   the shaft of the stirring part is protruded from the inclined plane perpendicularly to the inclined plane, and
   the stirring member includes a part extended in a radial direction of the inclined plane and parts extended from ends of the part along the conical wall.

2. The powder/granular material feeding device according to claim 1, wherein the shaft of the stirring part protrudes to a center of the interior of the chute in plan view.

3. The powder/granular material feeding device according to claim 1, wherein the outlet portion contains a screw.

4. The powder/granular material feeding device according to claim 3, wherein the outlet portion includes a screw casing and a longitudinally extended part of the conical wall of the chute and the screw casing of the outlet portion are linearly connected and opened.

5. The powder/granular material feeding device according to claim 1, wherein the inclined plane of the chute is circular.

6. The powder/granular material feeding device according to claim 1, wherein the hopper is oval and has a constant cross-sectional shape in a vertical direction.

7. The powder/granular material feeding device according to claim 1, further comprising a driving force transmission mechanism that transmits a driving force of a motor to a screw provided in the outlet portion and the stirring part, wherein the outlet portion and the stirring part are driven through the driving force transmission mechanism.

8. The powder/granular material feeding device according to claim 1, wherein the side wall of the chute is oval in plan view and has a constant cross-sectional shape in a vertical direction.

9. The powder/granular material feeding device according to claim 1, wherein the side wall of the chute has a cross-sectional shape expanding in a lower part of the chute relative to an upper part.

10. The powder/granular material feeding device according to claim 9, wherein the side wall of the chute has a circular upper end in plan view.

11. The powder/granular material feeding device according to claim 10, wherein the hopper is circular and has a constant cross-sectional shape in a vertical direction.

* * * * *